United States Patent [19]

Maeda

[11] Patent Number: 5,761,925
[45] Date of Patent: Jun. 9, 1998

[54] ABSORPTION HEAT PUMP AND DESICCANT ASSISTED AIR CONDITIONER

[75] Inventor: Kensaku Maeda, Fujisawa, Japan

[73] Assignee: Ebara Corporation, Tokyo, Japan

[21] Appl. No.: 769,253

[22] Filed: Dec. 18, 1996

[30]       Foreign Application Priority Data

| Dec. 21, 1995 | [JP] | Japan | 7-333053 |
| Dec. 21, 1995 | [JP] | Japan | 7-333057 |
| Dec. 21, 1995 | [JP] | Japan | 7-333079 |
| Dec. 21, 1995 | [JP] | Japan | 7-333080 |
| Dec. 21, 1995 | [JP] | Japan | 7-333219 |

[51] Int. Cl.⁶ .................................................. F25B 15/00
[52] U.S. Cl. .......................... 62/476; 62/101; 62/238.3; 62/335
[58] Field of Search ...................... 62/476, 335, 238.3, 62/498, 101, 112

[56]            References Cited

U.S. PATENT DOCUMENTS

| 2,700,537 | 1/1955 | Pennington . | |
| 3,483,710 | 12/1969 | Bearint . | |
| 4,441,332 | 4/1984 | Wilkinson | 62/238.3 |
| 4,542,628 | 9/1985 | Sarkisian et al. | 62/335 |
| 4,667,485 | 5/1987 | Ball et al. | 62/476 |
| 4,732,008 | 3/1988 | DeVault | 62/79 |
| 4,827,728 | 5/1989 | DeVault et al. | 62/79 |
| 4,887,438 | 12/1989 | Meckler . | |
| 4,905,479 | 3/1990 | Wilkinson . | |
| 5,181,387 | 1/1993 | Meckler | 62/59 |
| 5,325,676 | 7/1994 | Meckler . | |
| 5,449,895 | 9/1995 | Coellner et al. . | |

*Primary Examiner*—William Doerrler
*Attorney, Agent, or Firm*—Armstrong, Westerman, Hattori, McLeland & Naughton

[57]            ABSTRACT

The absorption heat pump device is used in an air conditioner including a desiccant. The absorption heat pump includes a heat pump unit 1 and a heat pump unit 2 to provide heat generated from thermal action of the heat pumps including the heat of condensation of the refrigerant and the heat of absorption from the concentrated solution for heating regeneration air taken from an outside environment and a quantity of heat extracted from a low temperature heat transfer medium to produce an intermediate temperature hot water of about 60°–80° C. The heat pump device also provides chilled water of about 15° C. temperature, for use in cooling process air. The judicious use of heat provided by the absorption heat pump enables to achieve a high level of energy conservation for performing desiccant assisted air conditioner which operates at high efficiency.

15 Claims, 16 Drawing Sheets

ABSORPTION HEAT PUMP AND DESICCANT ASSISTED AIR CONDITIONER

BACKGROUND OF THE INVENTION

1. Field of the Invention

The present invention relates to absorption heat pumps in general, and relates in particular to an absorption heat pump utilized as a heat source in a desiccant assisted air conditioner and an air conditioner based on the heat pump device.

2. Description of the Related Art

Desiccant assisted air conditioner is well known, for example in a U.S. Pat. No. 2,700,537. The system discloses a desiccant assisted air conditioner requiring a heat source in a temperature range of 100°~150° C. for regenerating the desiccant (moisture adsorbent), and heat sources such as electric heaters and boilers are primarily utilized. In recent years, desiccants which can be regenerated at lower temperatures in a range of 60°~80° C. have been developed, enabling the use of heat sources operating at lower temperatures. FIG. 15 is a schematic representation of a typical example of such improved desiccant assisted system, and FIG. 16 is a psychrometric chart showing the operation of this example system. In FIG. 15, the reference numeral 101 refers to a conditioning space; 102 refers to a blower; 103 refers to a desiccant wheel; 104 refers to a sensible heat exchanger; 105 refers to a humidifier; 106 refers to a water supply pipe for the humidifier; 107~111 refer to air ducts for conditioned air flows; 130 refers to a blower for the regeneration air; 120 refers to a heat exchanger for hot water and regeneration air (hot water heat exchanger); 121 refers to a sensible heat exchanger; 122, 123 refer to hot water pipes; and 124~129 refer to air ducts for regeneration air. In FIG. 15, circled letters K~V represent the thermodynamic state of the air medium being processed to correspond to respective sites shown in FIG. 16. SA designates supply air, RA designates return air, OA designates outside air and EX designates exhaust air.

The operation of such a system will be explained in the following. In FIG. 15, the ambient air from the room 101 to be conditioned (process air) is drawn through a passage 107 into a blower 102 to be pressurized and is forwarded to a desiccant wheel 103 through a passage 108. In the desiccant wheel 103, the humidity ratio of the ambient air is lowered by the removal of moisture from the ambient air to the moisture adsorbent in the desiccant wheel 103. During the process of absorption, the heat of adsorption is released into the process air which rises in temperature. The process air with a warmer temperature and a lower humidity is forwarded through the passage 109 to the sensible heat exchanger 104, and is cooled by heat exchange with outside air (regeneration air). The cooled air is forwarded to a humidifier 105 through a passage 110 to be cooled by such means as water spray or evaporative humidifier in an isenthalpic process and is returned to the conditioning room 101 through a passage 111.

The desiccant material takes in moisture during this process, and it must be regenerated. In this example, this is performed as follows. Outside air (regeneration air) OA is drawn into the blower 130 through a passage 124 to be pressurized and forwarded to the sensible heat exchanger 104, cools the process air and in the process raises its own temperature. The warm air OA flows into a next sensible heat exchanger 121 through a passage 125 and raises its temperature by heat exchange with the spent high temperature regeneration air after regeneration. The regeneration air from the heat exchanger 121 flows into a hot water heat exchanger 120 through a passage 126 so that its temperature rises to a range of 60°~80° C., and its relative humidity is lowered. The regeneration air with a lowered humidity passes through the desiccant wheel 103 to remove the moisture from the desiccant wheel. Spent air from the desiccant 103 flows through a passage 128 to enter the sensible heat exchanger 121 to preheat the regeneration air prior to regeneration, and flows through a passage 129 to be exhausted externally.

The above process can be explained with reference to the psychrometric chart shown in FIG. 16. The ambient air in room 101 to be air conditioned (air for processing: state K) is drawn into the blower 102 through the passage 107 to be pressurized, and flows through the passage 108 to reach the desiccant wheel 103 so that its humidity ratio will be lowered by the loss of moisture to the moisture adsorbent in the desiccant wheel while its temperature rises (state L) by the heat of adsorption. The air with a lower humidity and a higher temperature flows through the passage 109 to reach the sensible heat exchanger 104, and is cooled by heat exchange with the regeneration air (state M). The cooled air flows through the passage 110 to reach the humidifier 105 so that its temperature is lowered in an isenthalpic manner by means of water spray or evaporative humidifier (state P), and is returned through the passage 111 to the conditioning space 101.

As explained above, a difference in enthalpy $\Delta Q$ is generated between the returned air (K) and the supply air (P) which is responsible for cooling the conditioning space 101. The desiccant is regenerated as follows. Outside air (OA: state Q) is withdrawn through the passage 124 into the blower 130, is pressurized, forwarded to the sensible heat exchanger 104, cools the process air and raises its own temperature (state R), flows into the passage 125 and the next heat sensible exchanger 121, exchanges heat with the spent high temperature air so that its own temperature rises (state S). Regeneration air from the sensible heat exchanger 121 flows through the passage 126 to reach the hot water heat exchanger 120 and is heated by the hot water to a temperature between 60°~80° C., so that its relative humidity is lowered (state T). The regeneration air having a lowered humidity flows through the desiccant wheel 103 thereby losing its moisture (state U). Spent outgoing air from the desiccant wheel 103 flows through the passage 128 to reach the sensible heat exchanger 121 to preheat the regeneration air prior to regeneration process, and lowers its own temperature (state V) and flows into the passage 129 to be exhausted out as waste air.

The processes of regeneration of desiccant and dehumidification of the ambient air described above is repeatedly performed to provide the desiccant assisted air conditioning process. The conditioning energy efficiency of such a system is given by a value of coefficient of performance (COP) which is obtained by dividing the enthalpy difference $\Delta Q$ (a measure of cooling effect) shown in FIG. 16 by regeneration heat $\Delta H$ (i.e., COP=$\Delta Q/\Delta H$). However, in the conventional desiccant assisted air conditioner, even though the temperature of the hot water utilizable for heating the regeneration air has been lowered compared with the earlier systems, the COP values for conventional desiccant assisted air conditioners is still lower than those of air conditioners based on other thermally driven refrigeration devices (for example, double effect absorption chiller) for cooling and dehumidification of ambient air. The reason is that the regeneration of desiccant material still has been done by utilizing the high temperature heat sources such as boiler, and the system is still operated at temperatures less than 100° C., in which one unit of high quality energy (excergy) of fuel is converted into less than one unit.

SUMMARY OF THE INVENTION

It is an object of the present invention to provide an absorption heat pump device for use in an air conditioner including a desiccant regeneration arrangement. The heat pump device provides a heat source to replace a boiler, for example, comprising an external heat source for heating regeneration air taken from an outside environment and a quantity of heat extracted from a low temperature vapor of a fluid medium to produce an intermediate temperature hot water of about 60°–80° C. The heat pump device also provides chilled water of about 15° C. temperature, for use in cooling process air which is required during the process of air conditioning of an air conditioning space. The judicious use of heat provided by the heat pump device enables to achieve a high level of energy conservation for performing desiccant assisted air conditioning while also providing an air conditioner which operates at high efficiency.

The object has been achieved in an absorption heat pump comprising a first circulation unit having a first evaporator, a first absorber, a first generator and a first condenser for providing a first absorption refrigeration cycle operating at a first operating temperature; a second circulation unit having a second evaporator, a second absorber, a second generator and a second condenser for providing a second absorption refrigeration cycle operating at a second operating temperature lower than the first operating temperature; a first heat exchanger for performing a heat exchange between the first evaporator and the second absorber; a second heat exchanger for performing a heat exchange between the first condenser and the second generator; and a thermal medium transport means for extracting heat of absorption in the first absorber and heat of condensation in the second condenser for external use in a manner that an absorption temperature in the first absorber is higher than condensation temperature in the second condenser.

An aspect of the heat pump device is that the thermal medium transport means comprises a fluid passage means for performing heat exchange therethrough, the fluid passage means communicating with a condenser heat transfer pipe provided within the second condenser and an absorber heat transfer pipe provided within the first absorber.

It should be noted that absorption heat pump in this invention includes refrigeration devices. The heat pump device is arranged so that the absorption temperature in the first circulation unit is higher than the condensation temperature in the second circulation unit, by arranging to enable accessing and externally removing the heat of absorption in the first circulation unit and the heat of condensation in the second circulation unit, therefore, the medium has temperature difference which is utilized as a heat source for desiccant assisted air conditioning purposes to replace a boiler, for example. The use of the heat pump device system (including refrigerators) of the present invention, an amount of heat representing the sum of heat input to the generator in the first circulation unit and heat removed from the condenser in the second circulation unit. The heat is used to produce hot water in the range of 60°–80° C. which is used for desiccant regenerating. Also, chilled water which is used to cool the process air for use in the air conditioning process in the form of water of about 15° C. by utilizing the heat of evaporation in the evaporator in the second circulation unit. This represents an energy saving for the primary energy for desiccant assisted air conditioning. The cooling efficiency and the overall coefficient of performance are also improved over the conventional systems.

DESCRIPTION OF THE PREFERRED EMBODIMENTS

Preferred embodiments will be explained below with reference to the drawings.

Figure 1:
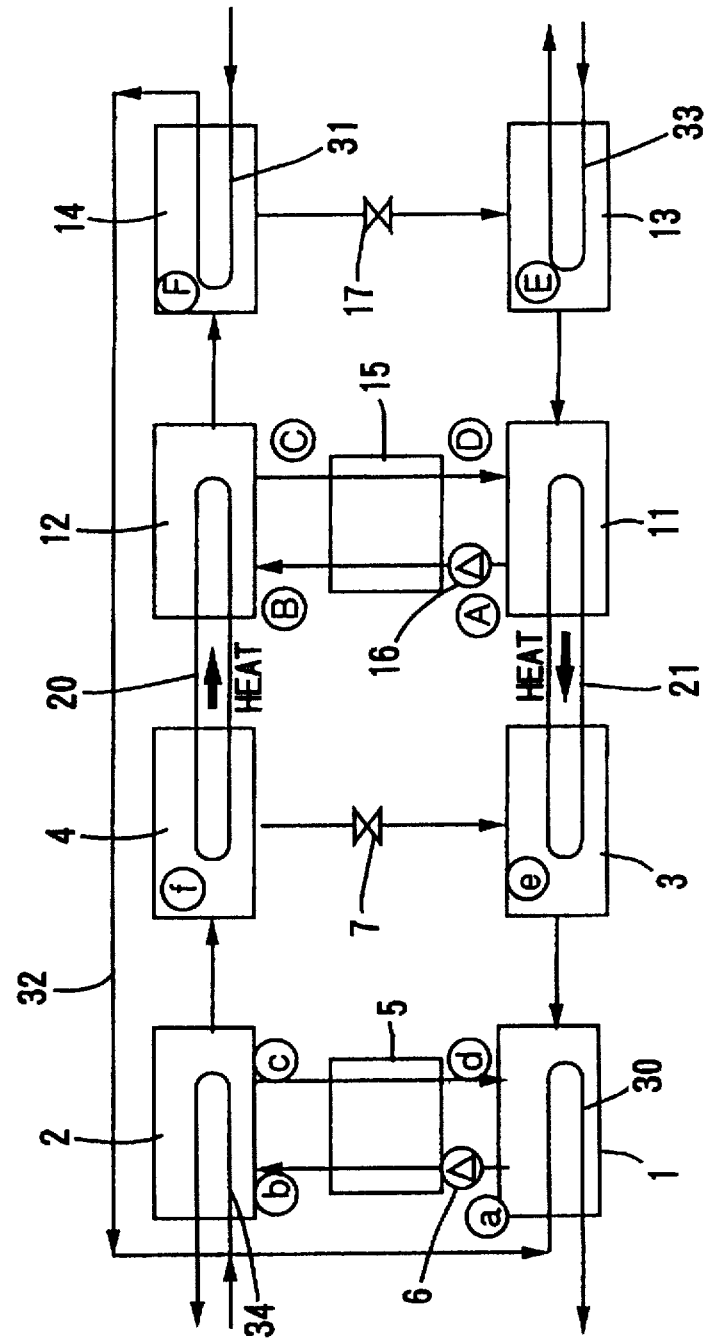
FIG. 1 is a schematic representation of a first embodiment of the heat pump device of the present invention.

FIG. 1 is a schematic drawing of the basic configuration of the absorption heat pump of the present invention. The heat pump comprises a first circulation unit to provide an absorption refrigeration cycle including a first evaporator 3; a first absorber 1; a first generator 2; a first condenser 4; and a heat exchanger 5 between the solution passages to and from the first absorber 1 and the first generator 2, and a second circulation unit operating at a lower temperature than the first circulation unit including a second evaporator 13; a second absorber 11; a second generator 12; a second condenser 14; a heat exchanger 15 between the solution passages to and from the second absorber 11 and the second generator 12. A first heat exchanger 21 is provided between the first evaporator 3 in the first circulation unit and the second absorber 11 in the second circulation unit, as well a second heat exchanger 20 is provided between the first condenser 4 in the first circulation unit and the second generator 12 in the second circulation unit. A heat transfer medium passage 32 is provided for extracting the heat of absorption from the first circulation unit and the heat of condensation from the second circulation unit for using in an external device such as an air conditioning apparatus. The heat transfer medium passage 32 comprises a condenser heat transfer pipe 31 in the second circulation unit and an absorber heat transfer pipe 30 in the first circulation unit. The heat transfer medium is made to flow in the passage 32 from the condenser heat transfer pipe 31 to the absorber heat transfer pipe 30 for performing heat exchanges so that the heat pump is operated in a manner that the absorption temperature in the first circulation unit is higher than the condensation temperature in the second circulation unit.

The operational cycle of the absorption heat pump of such a configuration will be explained below. The solution in the first circulation unit is heated in the generator 2 by an external heat source (not shown) through the heat transfer pipe 34 to generate a vapor of the refrigerant, is concentrated and delivered to the absorber 1 through the heat exchanger 5. In the absorber 1, the solution absorbs the refrigerant evaporated in the evaporator 3, and after being diluted, returns to the generator 2 again through the heat exchanger 5 by the pumping action of the pump 6. In the absorber 1, heat exchange is performed by a thermal medium such as hot water through heat transfer pipe 30 to utilize the heat of absorption generated during the process. The refrigerant vapor generated in the generator 2 flows into the condenser 4 to be condensed. In the condenser 4, the heat of condensation generated during the process is transferred to the generator 12 in the second circulation unit through the heat transfer pipe 20 performing heat exchange therebetween. The condensed refrigerant flows into the evaporator 3 to be evaporated. In the evaporator 3, the evaporation heat needed during the process is transferred from the absorber 11 in the second circulation unit.

Also, as commonly practiced in the double effect absorption chiller, it is permissible to place the heat transfer pipe for the condenser 4 in the generator 12 in the second circulation unit to obtain the same result.

The solution in the second circulation unit is heated in the generator 12 by the heat transferred from the first circulation unit to generate a vapor of the refrigerant, is concentrated and delivered to the absorber 11 through the heat exchanger 15. In the absorber 11, the solution absorbs the refrigerant evaporated in the evaporator 13, and after being diluted, returns to the generator 12 again through the heat exchanger 15 by the pumping action of the pump 16. In the absorber 11, the heat of absorption generated during the process is transferred to the evaporator 3 in the first circulation unit through the heat transfer pipe 21. The vapor of the refrigerant flows into the condenser 14 to be condensed. The heat of condensation generated in the condenser 14 is utilized by transferring it in the heat transfer medium through the heat transfer pipe 31.

In the foregoing, by flowing the refrigerant from the condenser heat transfer pipe 31 in the second circulation unit to the absorber heat transfer pipe 30 in the first circulation unit in this order, the temperature of the solution in the first circulation unit is maintained higher than the refrigerant condensation temperature in the second circulation unit. The condensed refrigerant is delivered to the evaporator 13 to be evaporated. In the evaporator 13, the cold heat of evaporation is utilized by gaining it through the thermal medium such as chilled water through the heat transfer pipe 33. It is also permissible to place the heat transfer pipe for the absorption device 11 directly inside the evaporator 3 in the first circulation unit to obtain the same effect.

Figure 2:
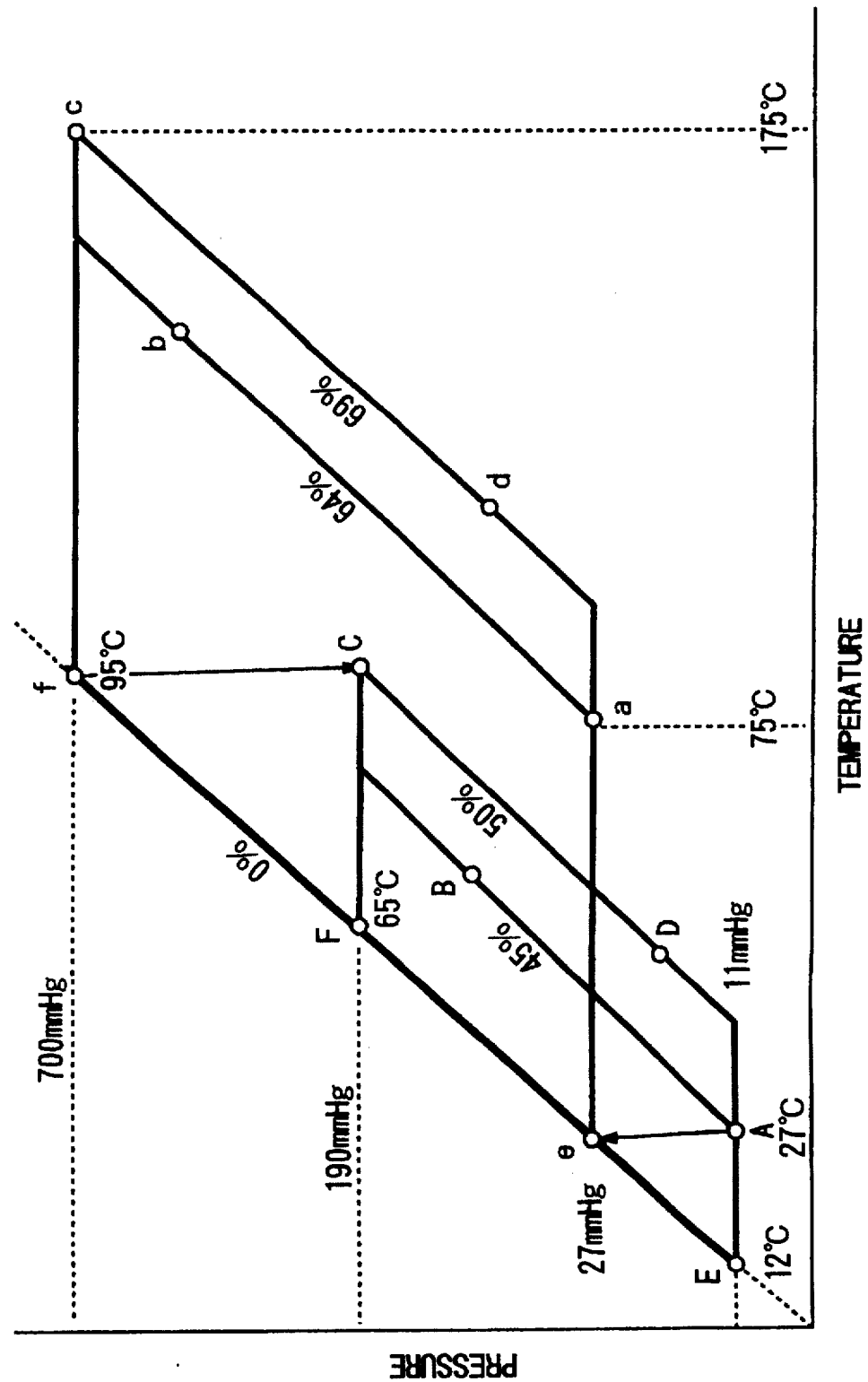
FIG. 2 is a Duhring's diagram showing the operational cycles of the first embodiment.

The operation of the absorption heat pump of the above configuration will be explained with reference to FIG. 2. FIG. 2 is a Duhring's diagram showing the operational cycle of the absorption heat pump shown in FIG. 1. This is a typical example commonly used in the absorption chiller employing a lithium bromide absorbent and water refrigerant system. The alphabetical designations shown in this drawing are related to thermodynamic states of the solution or refrigerant, and the corresponding designations are also shown in FIG. 1. The solution in the first circulation unit is heated in the generator 2 by an external heater to generate a vapor of the refrigerant, and after being concentrated (state c: 175° C. in FIG. 2), it flows into the heat exchanger 5 (state d) to be delivered to the absorber 1. In the absorber 1, the solution absorbs the refrigerant evaporated in the evaporator 3, and after being diluted (state a), it is heated again in the heat exchanger 5 (state b) to return to the generator 2. The vapor of the refrigerant generated in the generator 2 enters into the condenser 4 to be condensed (state f). The heat of condensation generated in the condenser 4 is transferred to the generator 12 in the second circulation unit through the heat transfer pipe 20. The condensed refrigerant is sent to the evaporator 3 to be evaporated (state e). The heat of evaporation needed in the evaporator 3 is transferred from the absorber 11 of the second circulation unit through the heat transfer pipe 21 (state A).

The solution in the second circulation unit is heated in the generator 12 by the heat of condensation of the first circulation unit (state f)to generate a vapor of the refrigerant, and after being concentrated (state C), it flows into the heat exchanger 15 (state D) to be delivered to the absorber 11. In the absorber 11, the solution absorbs the refrigerant evaporated in the evaporator 13 (state E), and after being diluted (state A), it is heated again in the heat exchanger 15 (state B) to return to the generator 12. In the absorber 11, the heat of absorption generated during the process is transferred to the evaporator 3 in the first circulation unit through the heat transfer pipe 21. The condensed refrigerant is sent to the evaporator 3 to be evaporated (state e). The refrigerant generated in the generator 12 flows into the condenser 14 to be condensed (state F). By flowing the heat transfer medium from the condenser heat transfer pipe 31 in the second circulation unit to the absorber heat transfer pipe 30 in the first circulation unit in this order, the absorption temperature of the solution in the first circulation unit (state a: 75° C. in FIG. 2) becomes higher than that of the condensation temperature of the refrigerant in the second circulation unit (state F: 65° C. in FIG. 2). The condensed refrigerant (state F) is delivered to the evaporator 13 to be evaporated (state E).

In the absorption heat pump of the configuration described above, the high temperature heat supplied by the external heater by the heating medium flowing through the heat transfer pipe 34 to the generator 2 in the first circulation unit is utilized for concentrating the solution circulating in the first circulation unit, and the heat possessed by the vapor of the refrigerant generated is utilized for concentrating the circulating solution of the second circulation unit, and thus enabling one thermal input source to conduct solution concentration for simultaneously driving two refrigeration cycles. Further, since the heat of absorption in the second circulation unit is used to evaporate the refrigerant in the first circulation unit of the same apparatus, it is possible to utilize the heat of absorption in the first circulation unit, and both the heat of condensation as well as the heat of evaporation in the second circulation unit, so that, as shown in FIG. 2, the delivery heat produced during the processes of absorption and condensation is accessed and extracted as hot water of about 60°~80° C., and that the absorptive heat of evaporation from the second circulation unit is accessed and extracted as chilled water of about 15° C.

The overall heat balance of the whole cycle shows that the thermal input into the circulation units consists of high temperature heat supplied from an external heat source to the first circulation unit and the heat removed from the chilled water for the evaporator in the second circulation unit while the output heat from the circulation units consists of the heat added to the hot water from the heat of absorption generated in the first circulation unit and from the heat of condensation generated in the second circulation unit. In other words, the hot water receives not only the high temperature heat supplied from the external heater in the first circulation unit but also the heat removed from the chilled water in the second circulation unit. Therefore the amount of heat available to the hot water is increased beyond the amount of heat supplied externally to the generator in the first circulation unit. Thus, it has been demonstrated that a heat pump effect is achieved in the overall thermal cycle produced in the present circulation units.

The thermal efficiency is further increased by constructing the passage for heat transfer medium, i.e., hot water for extracting the heat of absorption from the first circulation unit and the heat of condensation from the second circulation unit in a manner that the absorption temperature of the solution in the first circulation unit is higher than the condensation temperature of the refrigerant in the second circulation unit. The reason, which will be explained in more detail later, is that when using the hot water for desiccant regeneration to perform heat exchange with the sensible heat of ambient air, the specific heat of air is considerably lower than that of water. This means that even if the amount of hot water is lowered to cause a large variation in temperature, the heat exchange performance of the desiccant assisted air conditioning remains relatively unaffected and high. Therefore, the condensation temperature at the inlet side of the second circulation unit for producing the hot water can be set lower than the absorption temperature of the outlet side of the first circulation unit, and by adopting such an arrangement, it becomes possible to lower the pressure and temperature requirements of the generator 2 in the first circulation unit so that the quantity of heat to be supplied to the first circulation unit can also be decreased.

Next, the operation of an air conditioning apparatus which combines the absorption heat pump having the configuration presented above with the desiccant assisted air conditioner will be explained with reference to FIGS. 3 and 4. FIG. 4 is a psychrometric chart showing the operation of the air conditioning part of the apparatus shown in FIG. 3.

The apparatus is derived by connecting the hot water pipe and the chilled water pipe of the absorption heat pump shown in FIG. 1 to the desiccant air conditioner to be described below through the respective the hot water pump 150 and chilled water pump 160. The desiccant air conditioner shown in FIG. 3 is constructed as follows: the conditioning space 101 is communicated with the intake of the blower 102 through the passage 107; the outlet of the blower 102 is communicated with the desiccant wheel 103 through the passage 108; the discharge for the process air from the desiccant wheel 103 is communicated with the sensible heat exchanger 104 for the regeneration air through the passage 109; the outlet for the process air from the heat exchanger 104 is communicated with the chilled water heat exchanger 115 through the passage 110; the outlet for the process air from the chilled water heat exchanger 115 is communicated with the humidifier 105 through the passage 119; and the outlet for the process air from the humidifier 105 is communicated with the conditioning space 101 through the passage 111; thereby completing a processing cycle for the process air.

In the meanwhile, the processing route for the regeneration air is as follows: outside air is introduced by connecting the intake of the blower 130 through the passage 124; the outlet of the blower 130 is communicated with the sensible heat exchanger 104 heat-exchangeable with the process air; the outlet for the regeneration air from the sensible heat exchanger 104 is communicated with the inlet of the low temperature side of another heat exchanger 121 through a passage 125; the outlet of the low temperature side of the sensible heat exchanger 121 is communicated with the hot water heat exchanger 120 through the passage 126; the outlet for the regeneration air of the hot water heat exchanger 120 is communicated with the inlet of the regeneration air from the desiccant wheel 103 through the passage 127; the outlet for the regeneration air of the desiccant wheel 103 is connected to the inlet of the high temperature side of the sensible heat exchanger 121 through the passage 128; the outlet of the high temperature side of the sensible heat exchanger 121 is communicated with the external space through the passage 129 so that outside air can be introduced for use as regeneration air. The hot water inlet of the hot water heat exchanger 120 is communicated with the outlet of the absorber 1 of the first circulation unit in the hot water circuit of the absorption heat pump through the passage 122. The hot water outlet of the hot water heat exchanger 120 is communicated with the inlet of the condenser 14 in the second circulation unit in the hot water circuit of the absorption heat pump through the passage 123 and the hot water pump 150. The chilled water inlet of the chilled water heat exchanger 115 is communicated with the outlet of the evaporator 13 in the second circulation unit in the chilled water circuit of the absorption heat pump through the passage 117, and the chilled water outlet of the chilled water heat exchanger 115 is communicated with the inlet of the evaporator 13 in the second circulation unit in the chilled water circuit of the absorption heat pump through the passage 118 and the pump 160. In FIG. 3, the circled alphabetical designations K~V refer to the thermodynamic states of the air corresponding to those in FIG. 4, and SA designates supply air, RA designates return air, OA designates outside air and EX designates exhaust air.

The operation of the air conditioner is as follows. Referring to FIG. 3, the ambient air (process air) from the conditioning room 101 is withdrawn into the blower 102 to be pressurized, and the pressurized air is forwarded to the desiccant wheel 103 through the passage 108, wherein the humidity ratio in the process air is lowered by having the moisture in the ambient air removed in the moisture adsorbent in the desiccant wheel 103. Heat released during the adsorption process raises the temperature of the process air. The process air with lower humidity and higher temperature is forwarded to the sensible heat exchanger 104 and cooled by heat exchange with the outside air (regeneration air). The cooled process air is delivered through the passage 110 to the chilled water heat exchanger 115 for further cooling. The cooled process air is delivered to the humidifier 105 for cooling isenthalpically by water spray or evaporative humidifier, and the cooled process air is returned to the conditioning space 101 through the passage 111.

The desiccant becomes loaded with moisture in the above process, and it is necessary to be regenerated. In this embodiment, this is performed using the outside air as regeneration air as follows. Outside air (OA) is withdrawn into the blower 130 through the passage 124 to be pressurized, and the pressurized outside air is delivered to the sensible heat exchanger 104 through the passage 124, wherein the outside air cools the process air, and the outside air, having increased its own temperature, is forwarded to the next sensible heat exchanger 121 through the passage 125 wherein heat exchange takes place with the high temperature regenerated air to raise its temperature, and the regeneration air exiting the sensible heat exchanger 121 flows into the hot water heat exchanger 120 through the passage 126. The temperature of the regeneration air is raised to a temperature in a range of 60°~80° C. by the hot water, and its relative humidity decreases. This process corresponds to the sensible heat change of the regeneration air, and the specific heat of the regeneration air is extremely low compared with that of hot water, resulting in a large variation in the air temperature. Therefore, even if the flow rate of the hot water is decreased (resulting in variations in temperature of the hot water), heat exchange process can take place quite efficiently. Accordingly, the condensation temperature of the heat pump at the inlet side of the hot water in the second circulation unit can be set lower than the absorption temperature of the first circulation unit at the outlet of the hot water. By adopting such an approach, the pressure and temperature requirements in the generator 2 in the first circulation unit can be lowered, and the heat input load into the generator 2 in the first circulation unit can be also lightened. By making the useable temperature difference of the hot water to be large, the flow rate can be decreased, and therefore the transport load is also lowered.

The regeneration air exiting from the hot water heat exchanger 120 has a lower relative humidity than before, and in the process of flowing through the desiccant wheel 103 removes the moisture therefrom, thus performing regeneration of the desiccant material. Spent air which has passed through the desiccant wheel 103 flows into the sensible heat exchanger 121 through the passage 128, preheats the outside air and is exhausted through the passage 129 to outside environment.

The above-described process will be further explained with reference to psychrometric chart in FIG. 4. The air to be conditioned within the room 101 (process air: state K) is withdrawn into the blower 102 to be pressurized, and the pressurized process air is forwarded to the desiccant wheel 103 through the passage 108. The humidity ratio in the process air is lowered by absorption of moisture in the process air into the moisture adsorbent in the desiccant wheel 103, and the temperature is raised by the heat of adsorption (state L). The process air, having its humidity lowered and temperature raised, is delivered to the sensible heat exchanger 104 through the passage 109, and undergoes heat exchange with outside air (regeneration air) to lower its temperature (state M). The cooled process air is forwarded to the chilled water heat exchanger 115 through the passage 110 to be further cooled (state N). The cooled process air is delivered to the humidifier 105 through the passage 119 and lowers its temperature isenthalpically by water spray or evaporative humidifier (state P), and is returned to the conditioning space 101 through the passage 111. By the process described above, an enthalpy difference $\Delta Q$ between the returned air (state K) and the supply air (state P) is generated to perform cooling of the conditioning space 101.

Regeneration process of the desiccant is as follows. Outside air for regeneration (OA: state Q) is withdrawn into the blower 130 through the passage 124 to be pressurized, and is delivered to the sensible heat exchanger 104 to cool the process air while raising its own temperature (state R), and flows into the next sensible heat exchanger 121 through the passage 125, and, in exchanging heat with the high temperature regenerated air, raises its own temperature (state S). Regeneration air leaving the heat exchanger 121 flows into the hot water heat exchanger 120 through the passage 126 so that the temperature is raised to 60°~80° C., and its relative humidity is decreased (state T). Regeneration air having lower humidity passes through the desiccant wheel 103 to remove the moisture therefrom (state U). The spent air which has passed through the desiccant wheel 103 flows into the sensible heat exchanger 121 through the passage 128, and preheats regeneration air exiting from the sensible heat exchanger 104, and lowers its own temperature (state V). Spent air is exhausted to out side environment through the passage 129.

The process described above, i.e., regeneration of desiccant on one hand and dehumidification and cooling of process air on the other, is repeated to provide air conditioning of the conditioning space. It is a common practice to utilize exhaust air from the conditioning room as regeneration air, and in this invention also, there is no problem in recycling the exhaust room air for regeneration air, and the same result will be obtained.

The COP value to indicate the energy efficiency of the desiccant assisted conditioning having the present configuration can be calculated by dividing the enthalpy difference $\Delta Q$ representing the amount of cooling effect by the amount of heat input used for regeneration purpose, as shown in FIG. 4. Among the heat input $\Delta H$ added to regeneration air by the hot water heat exchanger, the amount of heat $\Delta q$ which was spent in the chilled water heat exchanger for cooling was pumped up from the process air by means of the above-described absorption heat pump through the chilled water heat exchanger 115 and the evaporator 13 in the second circulation unit. Therefore, the actual amount of heat supplied to the overall system is obtained by subtracting $\Delta q$ from $\Delta H$, which is denoted by $\Delta h$ which corresponds to the sensible heat change for transition from state X to state T. Accordingly, COP is given by an expression $\Delta Q/(\Delta H - \Delta q) = \Delta Q/\Delta h$. Comparing COP in FIG. 4 with the conventional COP in FIG. 6, it can be seen that in the present embodiment the cooling effect denoted by $\Delta Q$ in the numerator is increased by an amount equal to $\Delta q$, and that the heat input indicated by the denominator is lowered by an amount equal to $\Delta q$, thereby leading to a significant increase in the final COP. Sample calculations of COP for the present apparatus will be outlined below. Assuming that COP for the refrigeration effect of absorption heat pump is about 0.6, which is about the same as the conventional single effect absorption chiller, and COP for the conventional desiccant assisted air conditioning is 1.0, and that the heat input from an external heat source into the absorption heat pump is 1.0, then the heat input to hot water by the heat pump effect is 1.6. As this heat is used to operate the desiccant assisted air conditioning, heat input for the cooling effect is given by:

$$1.0(COP) \times 1.6(\text{input heat}) + 0.6(\Delta q) = 2.2$$

wherein, $\Delta q$ is refrigeration effect.

Therefore, the present COP is obtained as:

$$(\text{cooling effect})/(\text{heat input to absorption heat pump}) = 2.2/1.0 = 2.2$$

This value is far in excess of COP of 1.2 for the conventional double effect absorption chiller, thus indicating the present apparatus is operating at quite a high performance level of energy conservation.

Figure 5:
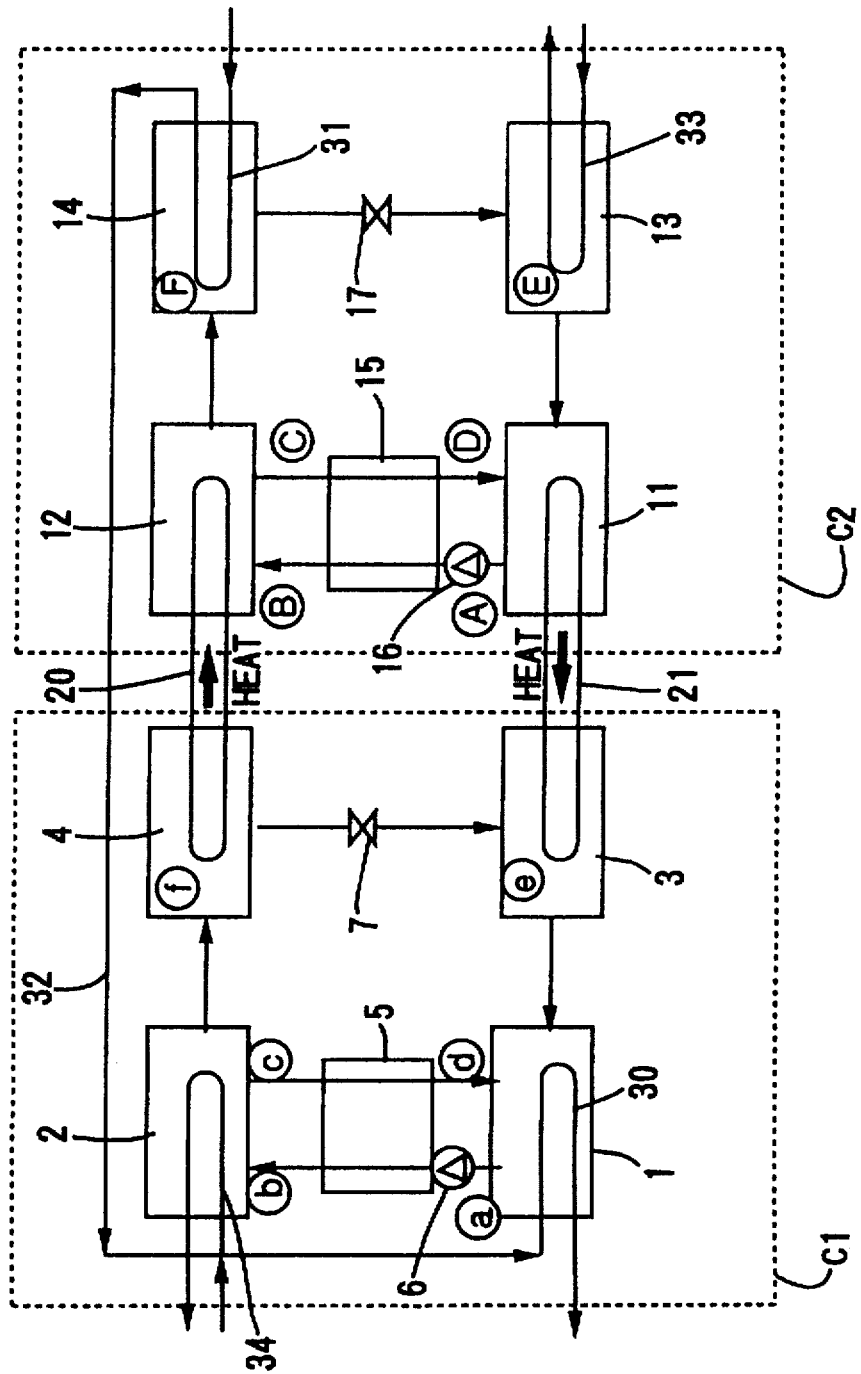
FIG. 5 is a schematic representation of a second embodiment of the heat pump device of the present invention.

FIG. 5 is a schematic drawing of a second embodiment of the absorption heat pump device of the present invention. The configuration of this embodiment apparatus is the same as the first embodiment apparatus, but different working fluids are used in the first and second circulation units.

Figure 3:
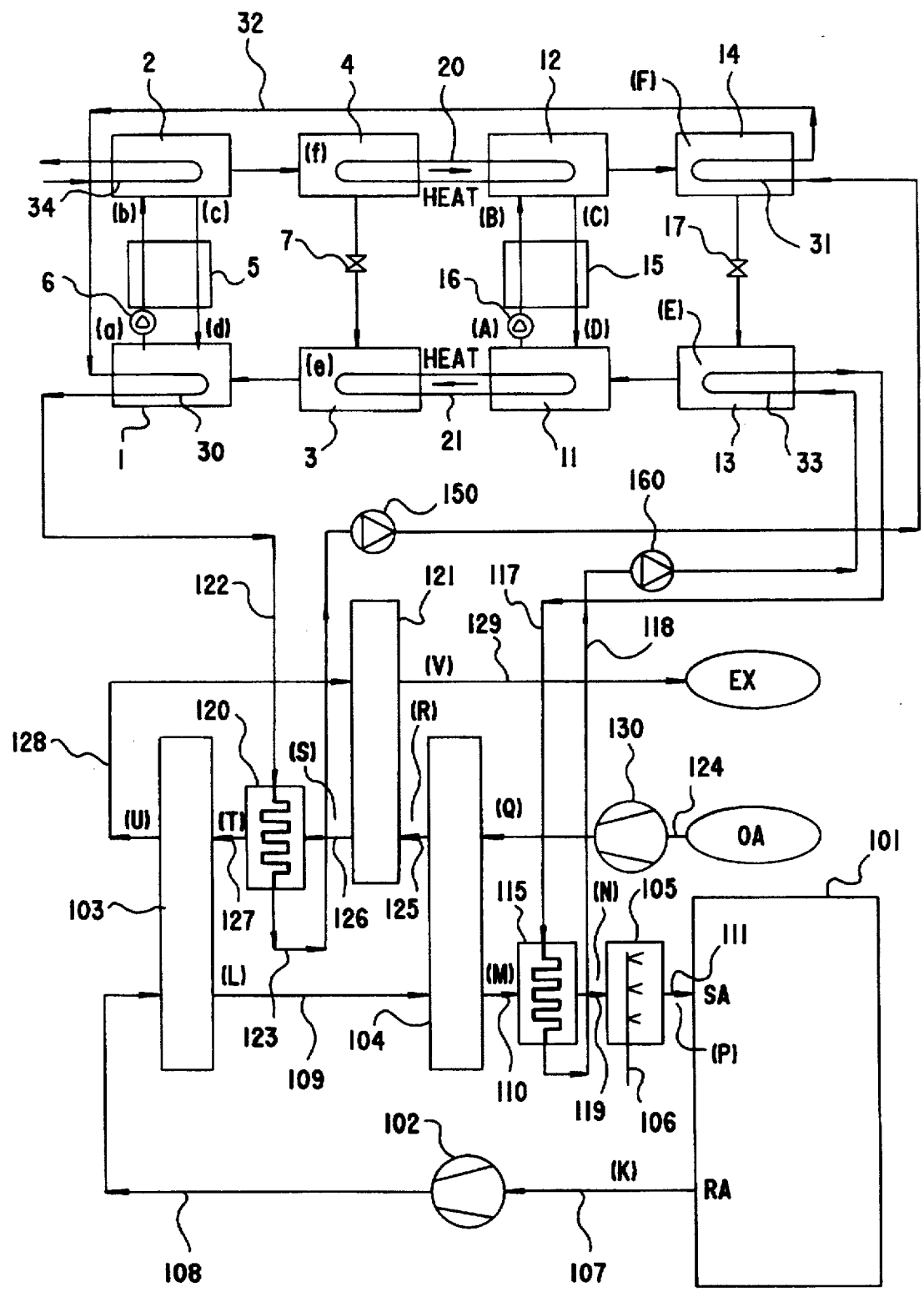
FIG. 3 is a schematic representation of a basic configuration of the application of the heat pump device to a desiccant assisted air conditioner.
Figure 4:
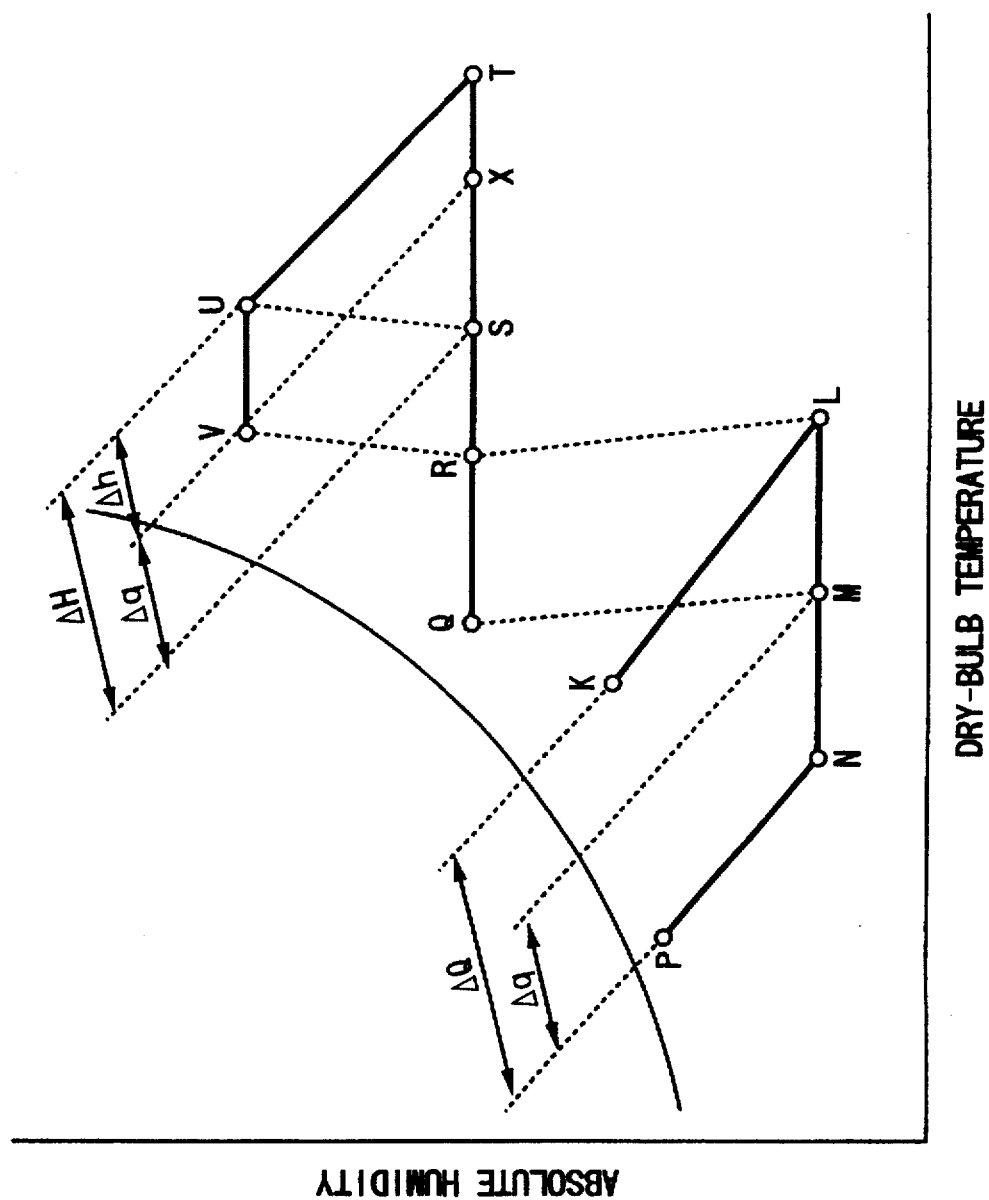
FIG. 4 is a psychrometric chart for the operational cycles of the air in the desiccant assisted air conditioner in which heat pump shown in FIG. 1 is used.

In the operation of the absorption heat pump shown in FIG. 3, the solution operates at high temperatures and high concentration in the first circulation unit C1, therefore, if for any reason there is a sudden change in temperature or in solution concentration (for example power failure to cause the heat pump to stop), then the solution is cooled in the high concentration state, and there is a danger of generating crystallization.

Therefore, in the second embodiment apparatus, working fluid used in the first circulation unit C1 is more difficult to crystallize than the working fluid used in the second circulation unit C2, in other words, a working fluid used in the first circulation unit C1 would not induce crystallization at temperature and vapor pressure conditions which would induce crystallization in the working fluid used in the second circulation unit. Specifically, the first circulation unit C1 preferably operates with working fluid adopting a mixture of lithium bromide and zinc chloride as absorbent and water as refrigerant, while the second circulation unit C2 operates with working fluid adopting lithium bromide as absorbent and water as refrigerant.

Figure 6:
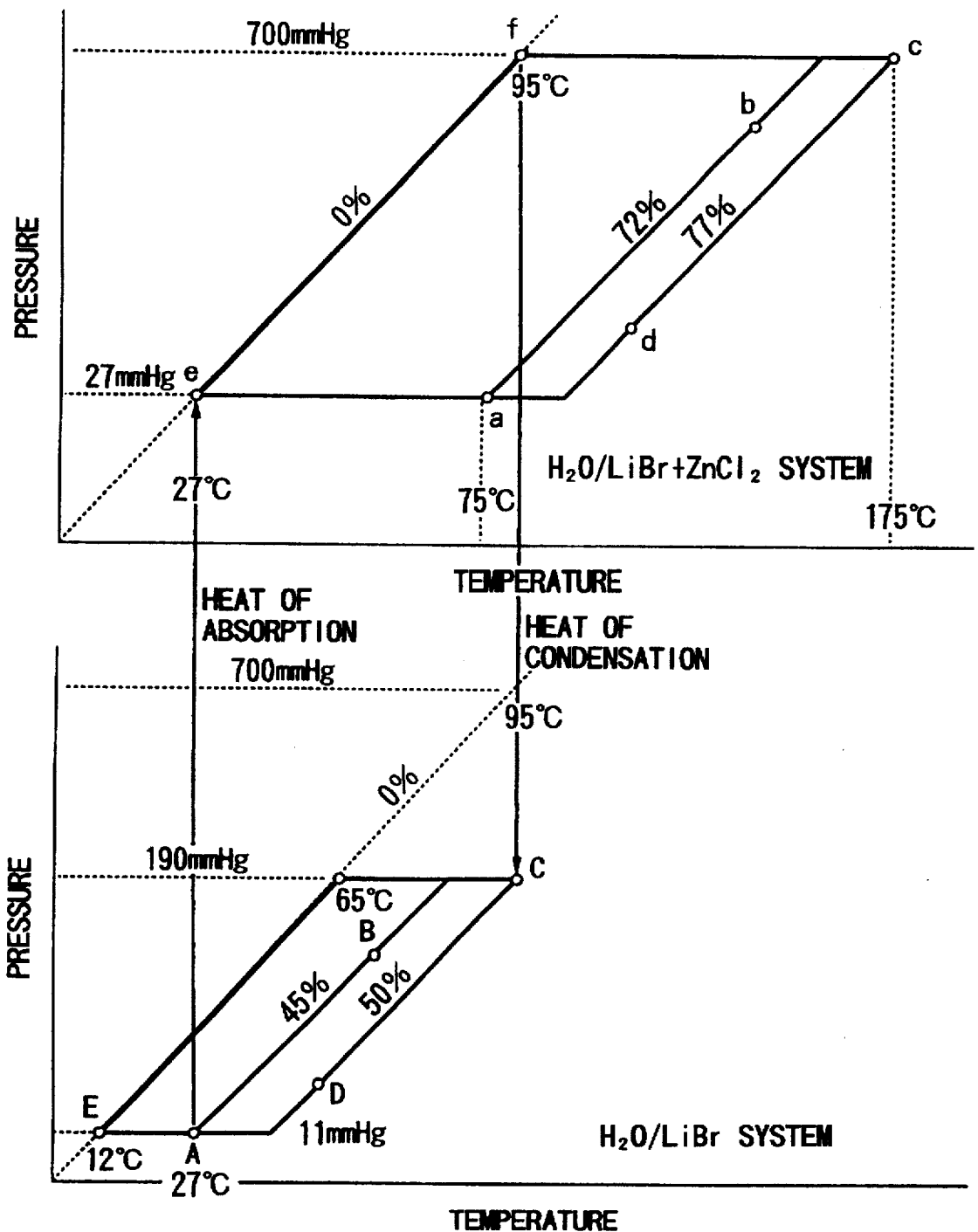
FIG. 6 is a Duhring's diagram of the heat pump device shown in FIG. 5.

The operational cycle of the absorption heat pump device of the above configuration is basically the same as that of the absorption heat pump device shown in FIG. 1, except for using different working fluids in the two operation cycles. FIG. 6 is the Duhring's diagram for the absorption heat pump shown in FIG. 5, which shows that, since the circulation units C1 and C2 have different absorption solutions, the operative concentrations are different but the basic process is the same as in the two devices.

It is known from the literature that the mixture of lithium bromide and zinc chloride in the first circulation unit C1 does not produce crystallized particles at room temperatures (for example, Japanese Association of Refrigeration's Journal, "Refrigeration", vol. 68, No. 789, page 722). Therefore, even if a sudden drop in temperature or concentration increase occurs during the operational cycle for any reason, there is no danger of the apparatus stopping due to the formation of crystallized particles in the working fluid, thus offering an apparatus having a highly reliable operational characteristics. Because there is no danger of mixing of the working fluids in the first and second circulation units in the present embodiment apparatus, it is possible to use two different working fluids. Other working fluids for avoiding the formation of crystallized particles include an ammonia and water system or a N-methyl, 2-pyrrolidine(NMP) and 2.2.2-trifluoroethan(TFE) system, for example. The absorption heat pump of the second embodiment can also be used as the heat source in the same configuration as that shown in FIG. 3, in conjunction with the desiccant assisted air conditioner. Such an apparatus also offers the same advantages and high operational reliability.

Figure 7:
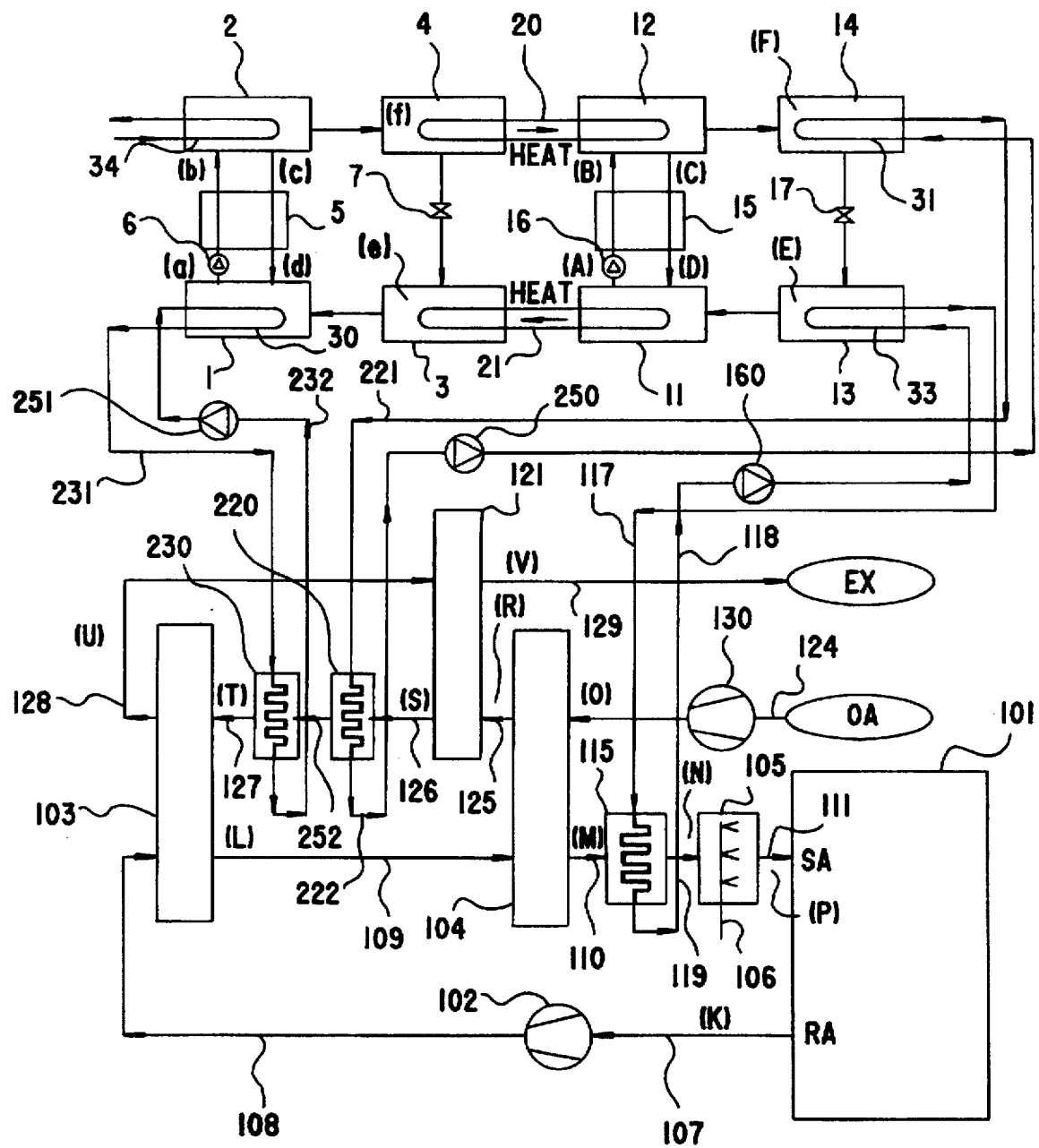
FIG. 7 is schematic representation of a third embodiment of the heat pump device of the present invention.

FIG. 7 shows a third embodiment of the desiccant assisted air conditioner of the present invention. The point of difference in the absorption heat pump of the third embodiment from that of the first embodiment is in the routing arrangement of the heat transfer medium. That is, the absorption heat pump as the heat source in the first circulation unit is transported through the passages 231, 232 communicating respectively with the absorber heat transfer pipe 30 and the pump 25 in the first circulation unit, and the heat of condensation as the heat source in the second circulation unit is transported through the passages 221, 222 communicating with the condenser heat transfer pipe 31 and the pump 250 so that the supply of heat from both heat sources can be used in the air conditioner.

The point of difference in the desiccant assisted air conditioner of the third embodiment from that in the embodiment shown in FIG. 3 is found in regeneration air routing. Specifically, the low temperature side outlet of the sensible heat exchanger 121 is connected to the first heater 220 through the passage 126, and the outlet of the first heater 220 is connected to the second heater 230 through the passage 252, and the outlet of the regeneration air from the second heater 230 is connected to the regeneration air inlet of the desiccant wheel 103 through the passage 127.

The point of difference in the connection route between the absorption heat pump and the desiccant assisted air conditioner shown in FIG. 3 is as follows. That is, the hot water inlet of the first heater 220 in the first circulation unit is connected to the outlet of the second condenser 14 in the second circulation unit in the hot water circuit of the absorption heat pump through the passage 221, the hot water outlet of the first heater 220 in the first circulation unit is connected to the inlet of the second condenser 14 in the second circulation unit in the hot water circuit of the absorption heat pump through the passage 222 and the pump 250. Also, the hot water inlet of the second heater 230 is connected to the outlet of the first absorber 1 in the first circulation unit through the passage 231, and the hot water outlet of the second heater 230 is connected to the inlet of the absorber 1 in the first circulation unit in the hot water circuit of the absorption heat pump through the passage 232 and the pump 251.

The operational cycle of the heat pump device in the desiccant assisted air conditioner is basically the same as the system shown in FIG. 1, and explanations will be omitted.

The operation of an apparatus combining the absorption heat pump with the desiccant assisted air conditioner will be explained as before using FIG. 4. The flow of process air is the same as the system shown in FIG. 3. Regeneration of desiccant is performed by the process air whose temperature is raised by the high temperature spent air through heat exchange in the sensible heat exchanger 121. Process air flows through the passage 126 into the first heater 220 which is heated by the hot water heated by the heat of condensation in the heat pump in the second circulation unit and its temperature rises to about 60° C. Process air then flows into the second heater 230 through the passage 252, and is warmed further by the hot water produced by the heat of absorption in the first circulation unit, and the temperature rises to about 75° C. so that its relative humidity is lowered. This process corresponds to sensible heat change in the regeneration air, and because the specific heat of air is significantly lower than that of hot water and air shows a large temperature variation, heat exchange efficiency can be performed effectively even if the first heater is operated at a lower temperature than the second heater. Therefore, the condensation temperature of the absorption heat pump in the second circulation unit can be set lower than the absorption temperature in the first circulation unit, and by adopting such an approach, the pressure and temperature of the first generator 2 in the first circulation unit can be set low, and the input heating load into the generator 2 in the first circulation unit is lightened.

Therefore, it is obvious that the effect of the third embodiment apparatus is the same as that for the apparatus shown in FIG. 3. Regeneration air given a lower relative humidity in the hot water heat exchanger 120 flows through the desiccant wheel 103 to regenerate the desiccant material by removing the moisture therefrom. Spent air passing through the desiccant wheel 103 flows into the sensible heat exchanger 121 through the passage 128, and preheats the regeneration air and is exhausted from the passage 129 to an outside environment.

The process to this point can be explained in the same way using the psychrometric chart shown in FIG. 3, and explanations regarding the energy conservation of the present embodiment will be omitted.

As described above, it is clear that the system presented in the present embodiment also improves the overall operating efficiency. The heat to the intermediate temperature heat source (60°~80° C.) for desiccant regeneration is obtained from both the heat of condensation in the first circulation unit and the heat of absorption derived from the second circulation unit, which is equivalent to the input heat for the generator in the first circulation unit plus evaporation heat in the second circulation unit. The evaporation heat from the second circulation unit is utilized for cooling the air used in desiccant assisted air conditioning to about 15° C. Thus, advantages such as energy conservation for desiccant regeneration as well as improved cooling efficiency are obtainable.

Figure 8:
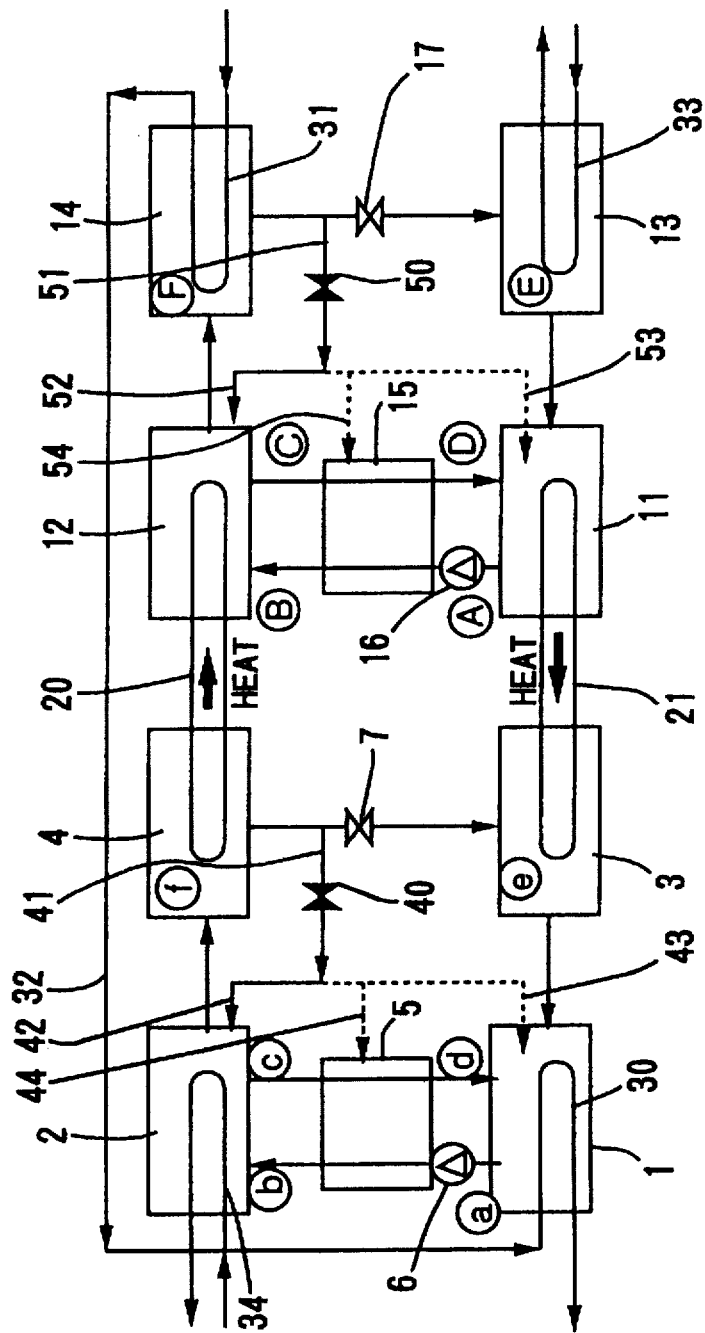
FIG. 8 is a schematic representation of a fourth embodiment of the heat pump device of the present invention.

FIG. 8 is a schematic drawing of the basic configuration of a fourth embodiment of the absorption heat pump device. The point of difference between the present embodiment and the first embodiment shown in FIG. 1 is the routing of the air flow. In this apparatus, fluid passages 41, 42 (or 43, 44) are provided for directly flowing the refrigerant condensed in the condenser 4 in the first circulation unit into the solution path including the first absorber 1 and the first generator 2, and , fluid passages 51, 52 (or 53, 54) are provided for directly flowing the refrigerant condensed in the condenser 14 in the second circulation unit into the solution path including the second absorber 11 and the second generator 12. As well, fluid valves 40, 50 are provided in the fluid passages 41, 51 so that the refrigeration process can be stopped by opening the valves 40, 50 so that the refrigerant can be flowed into the solution paths including the absorbers 1, 11 and the generators 11, 12 in the respective circulation units.

To operate the apparatus of such a configuration to provide cooling by heat pump effects, the apparatus can be operated as follows. The valves 40, 50 are first closed, and the valves 7, 17 are opened. In this case, the operation is exactly the same as the apparatus shown in FIG. 1, and explanation will be omitted. When the heat pump device of such a configuration is combined with the desiccant assisted air conditioner, the result is the same as that shown in FIG. 3, and explanations will again be omitted.

Figure 10:
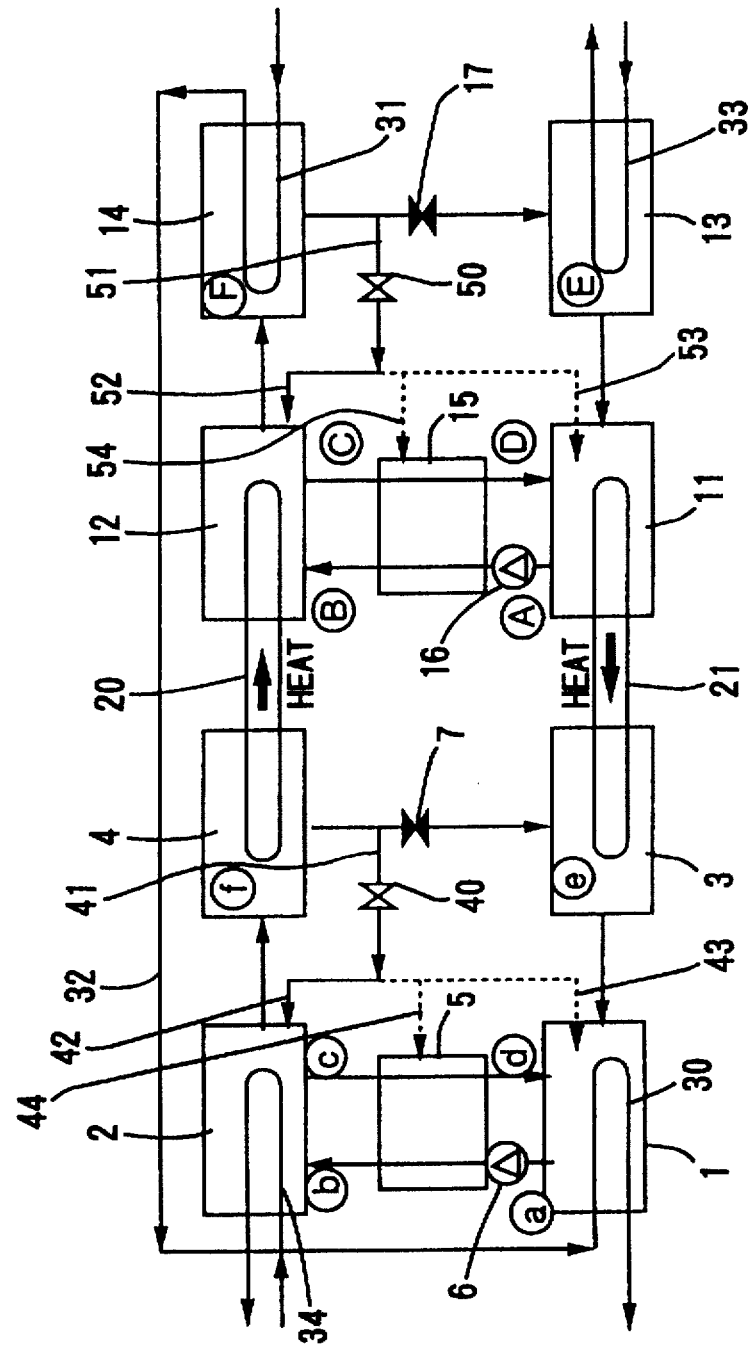
FIG. 10 is another embodiment of the application of the heat pump device shown in FIG. 8.

FIG. 10 shows a basic configuration of the heat pump device for stopping the refrigeration operation and obtain only hot water from the apparatus. For this operation, the valves 40, 50 are opened and the valves 7, 17 are closed.

The solution in the first generator 2 in the first circulation unit is heated by an external heater (not shown) through a heat transfer pipe 34, and the solution which produced the refrigerant vapor is delivered to the heat exchanger 5 to reach the first absorber 1. The fluid exiting the first absorber 1 is again directed to the heat exchanger 5 and returns to the first generator 2. The vapor of the refrigerant generated in the first generator 2 flows into the first condenser 4 to condense into a fluid. The heat generated in the first condenser 4 is transported to the second generator 12 through the second heat exchanger 20. The condensed refrigerant is forwarded to the first generator 2 through the passage 41, valve 40, passage 42 to merge with the solution and dilute it. Cooling medium does not flow into the first evaporator 3, and refrigeration effect is not obtained therefrom. There is also no absorption of the refrigerant in the absorber 1, and thus there is no generation of heat of absorption therefrom, and the hot water receives only the sensible heat from the solution. The solution in the second circulation unit is heated in the second generator 12 by the heat of condensation from the first circulation unit obtained through the second heat exchanger 20, and after generating the vapor of the refrigerant, the solution is delivered to the second absorber 11 through the heat exchanger 15. The solution exiting from the second absorber 11 returns to the second generator 12 by the action of the pump 16 again through the heat exchanger 15. The vapor of the refrigerant generated in the generator 12 enters into the second condenser 14, heats the hot water while condensing itself into a fluid. The condensed refrigerant is delivered to the second generator 12 through the passage 51, valve 50 and the passage 52 to merge with the solution to dilute it. In the second evaporator 13, there is no input of refrigerant and no refrigeration effect is obtained. There is no absorption of the refrigerant in the second absorber 11, and there is no generation of heat of absorption.

Figure 11:
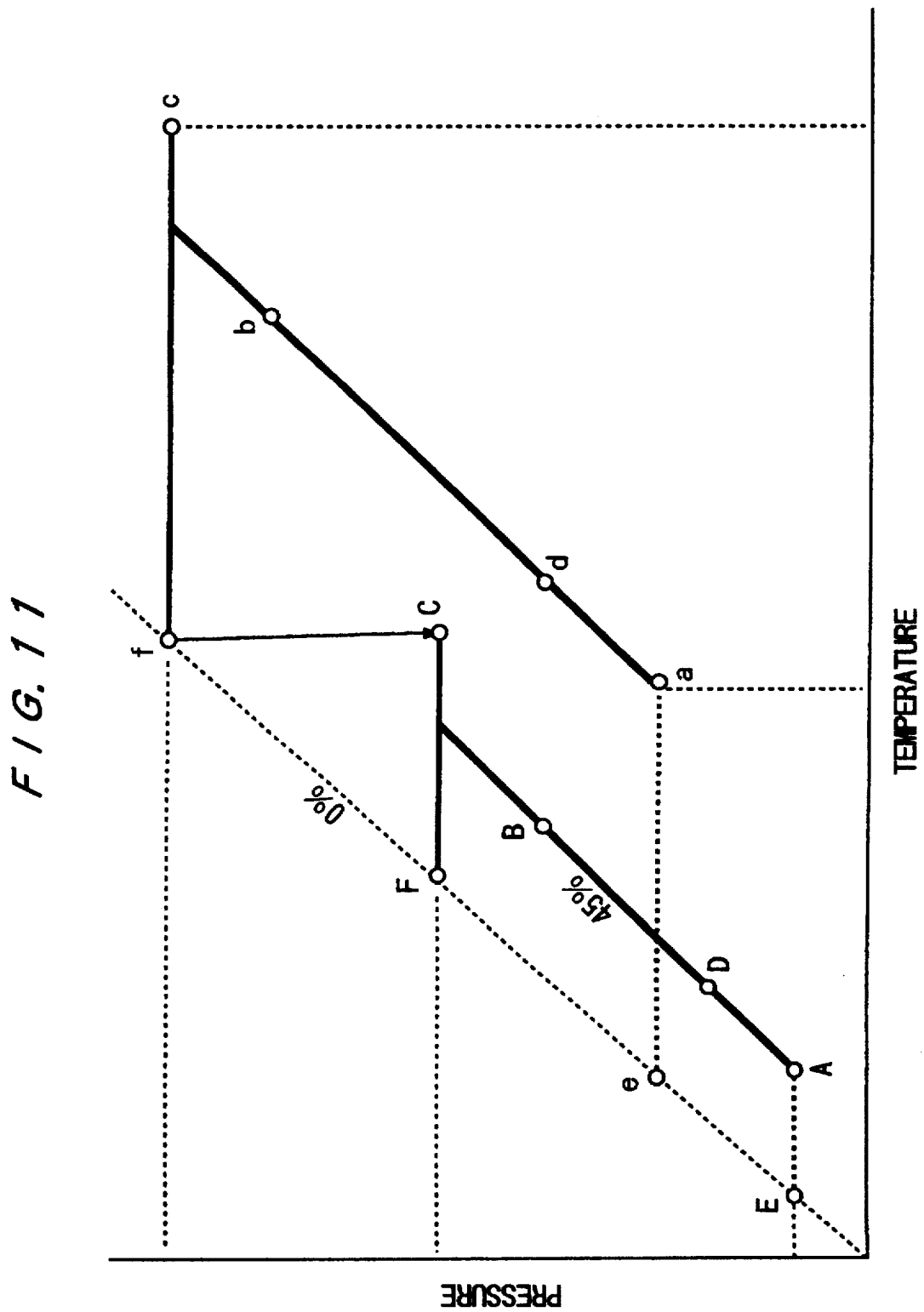
FIG. 11 is a Duhring's diagram of the heat pump device shown in FIG. 10.

The operation of the heat pump described above will be presented below with reference to FIG. 11. FIG. 11 is a Duhring's diagram showing the operational cycles of the heat pump shown in FIG. 10. This heat pump is a typical example of absorption refrigerating machine, based on commonly used lithium bromide-water system as absorbent and refrigerant. The circled alphabetical designations shown in the drawing refer to the thermodynamic states of the refrigerant, and the same designations are used in FIG. 10.

The solution in the first circulation unit is heated in the first generator 2 with an external heater to generate a vapor of the refrigerant and concentrated (state c). Then, it is again diluted with the refrigerant flowing in from the passage 42 and reaches the first absorber 1 in the first circulation unit through the heat exchanger 5 (state d). In the first absorber 1, the solution does not incorporate the refrigerant (state a) and is heated again through the heat exchanger 5 (state b) and returns to the first generator 2. The vapor of the refrigerant generated in the first generator 2 flows into the first condenser 4 and is condensed (state f). In the first condenser 4, the heat of condensation generated is transferred to the generator 12 in the second circulation unit through the second heat exchanger 20 in the second circulation unit. The condensed refrigerant is forwarded to the first generator 2 through the passage 41, valve 40 and the passage 42, and performs dilution of the solution in the generator. The solution in the second circulation unit is heated by the heat of condensation generated in the first circulation unit in the second generator 12 by flowing through the heat transfer pipe 20, generates a vapor of the refrigerant and after having been concentrated (state C), is diluted again by the refrigerant flowing from the passage 52, and passes through the heat exchanger (state D) and reaches the second absorber 11. In the second absorber 11, the solution does not incorporate the refrigerant (state A), is heated again through the heat exchanger 15 (state B) and returns to the second generator 12. The vapor of the refrigerant generated in the second generator 12 flows into the second condenser 14 and condenses (state F). The second condenser 14 transfers the heat of condensation to the hot water by the effect of the heat exchange of the heat transfer pipe. The condensed refrigerant is forwarded to the second generator 12 through the passage 51, valve 50 and the passage 52, and dilutes the solution in the generator. Incidentally, means for returning the refrigerant condensed in the first and second circulation units include such paths as those shown by the dotted lines in FIG. 10. For example, such path may include a combination of passage 44, 54 to return to the heat exchanger 15 or passages 43, 53 to return to the first and second absorbers 1, 11. So long as the absorbers and generators in each of the first and second circulation units are included, the refrigerant can be merged at points in the system to generate the same effects as those of the present embodiment.

In the operation of the present embodiment, if the vapor of the refrigerant is generated in the first circulation unit, there is also a similar generation of vapor in the second circulation unit, and therefore, the valves 40, 50 and the valves 7, 17 should be in the same operating status of closed or opened position respectively.

Figure 9:
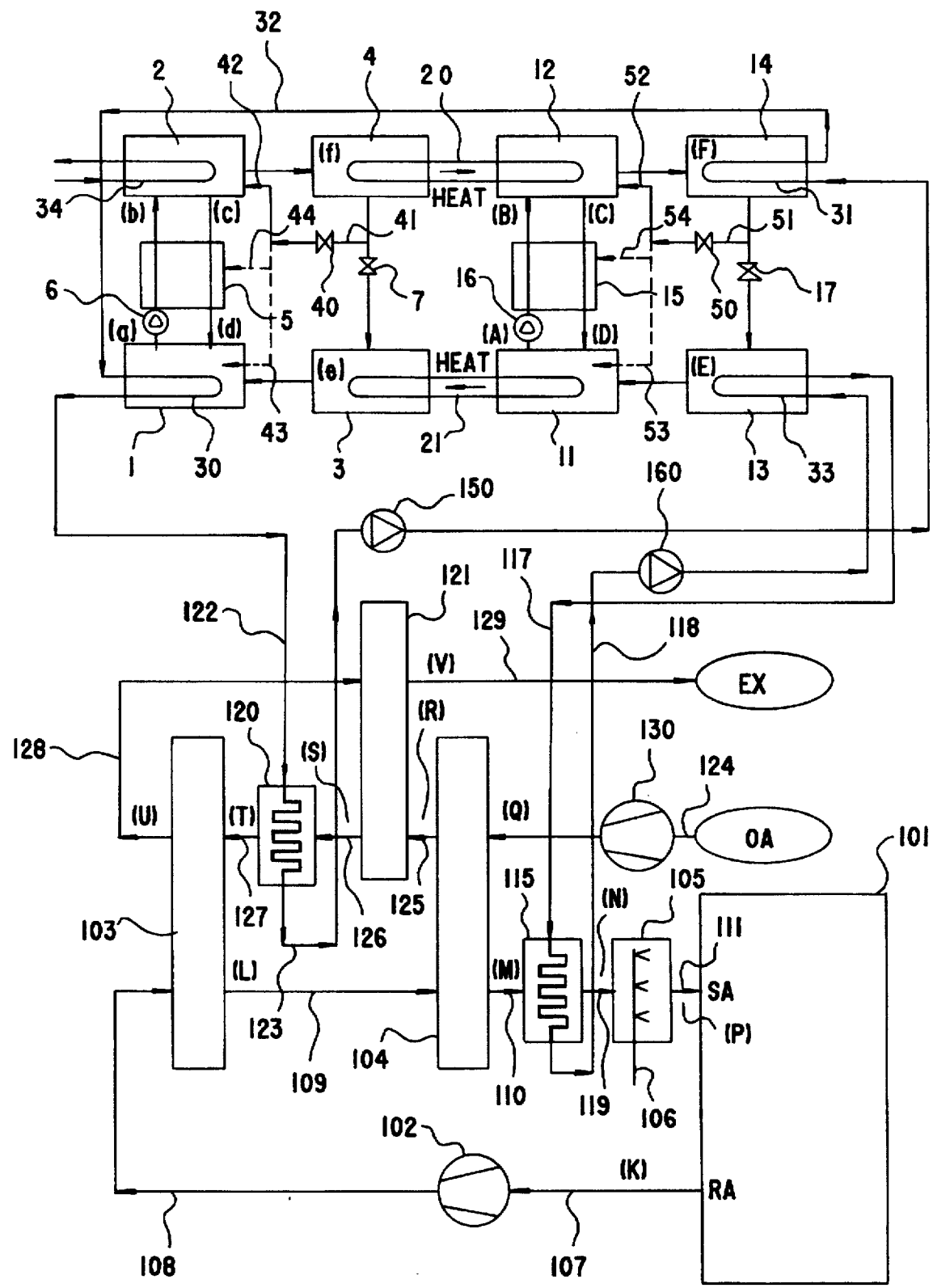
FIG. 9 is a schematic representation of an application of the heat pump shown in FIG. 8 for desiccant assisted air conditioning.
Figure 12:
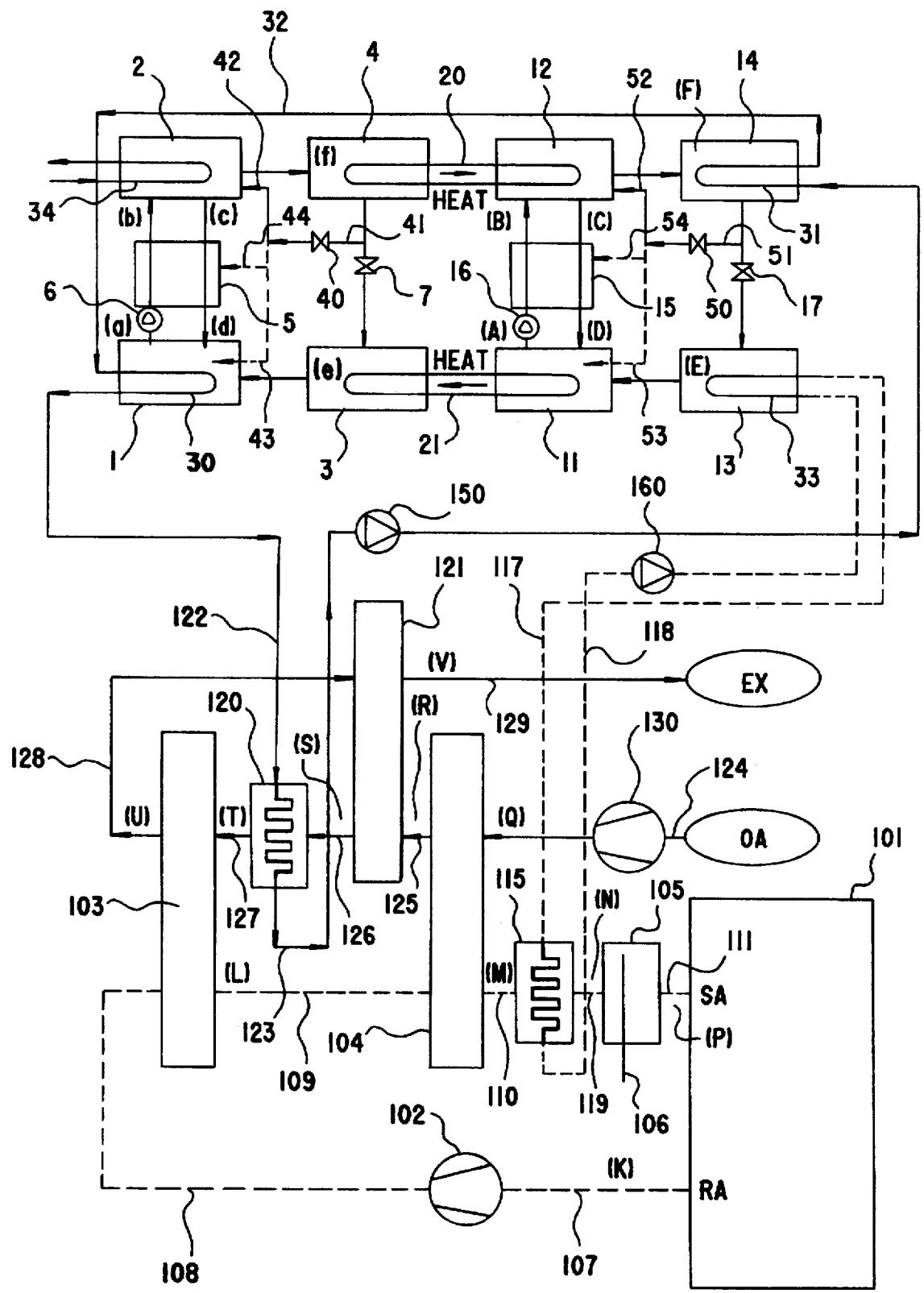
FIG. 12 is a schematic representation of an application of the heat pump shown in FIG. 10 for desiccant assisted air conditioning.

The operation of an air conditioning apparatus having a combined configuration of the above-described absorption heat pump with desiccant assisted air conditioner will be explained with reference to FIG. 12. In the embodiment presented in FIG. 12, hot water pipe and chilled water pipe of the heat pump device shown in FIG. 9 are respectively connected to the desiccant assisted air conditioner through the chilled water pump 160 and the hot water pump 150. In the following description of the desiccant assisted air conditioner, the process air cycle is stopped by turning off the blower 120, and only desiccant regeneration cycle is being carried out. Such a regeneration dedicated mode is adopted, for example, after a night-time air conditioning operation, when it is required to prepare for a quick-startup of the system for the next day. In this case, routing for the regeneration air is introduced by connecting the inlet of the blower 130 to the passage 124, the outlet of the blower 130 to the sensible heat exchanger 104 heat-exchangeable with the process air, the outlet of the sensible heat exchanger 104 for regeneration air to the inlet of the low temperature side of another heat exchanger 121 through the passage 125, the outlet on the low temperature side of the sensible heat exchanger 121 to the hot water heat exchanger 120 through the passage 126, the outlet for regeneration air of the hot water heat exchanger 120 to the inlet for the regeneration air of the desiccant wheel 103 through the passage 127, the outlet for the regeneration air of the desiccant wheel 103 to the inlet for the regeneration air on the high temperature side of the sensible heat exchanger 121 through the passage 128, the outlet on the high temperature side of the sensible heat exchanger 121 to outside environment through the passage 129, thereby completing a cycle path for introduction of outside air as regeneration air and discharge spent air to outside environment. The hot water inlet of the hot water heat exchanger 120 is connected to the outlet of the absorber 1 in the hot water circuit in the first circulation unit of the absorption heat pump device through the passage 122, and the hot water outlet of the hot water heat exchanger 120 is connected to the inlet of the condenser 14 in the hot water circuit in the second circulation unit of the absorption heat pump device through the passage 123 and the hot water pump 150.

The operation of the apparatus will be explained below. Referring to FIG. 12, outside air (OA) is withdrawn into the blower 130 to be pressurized and delivered to the sensible heat exchanger 104, and since the process air is stopped, its temperature is not raised, and the outside air flows into the next sensible heat exchanger 121 through the passage 125, and its temperature is raised through heat exchange with the high temperature spent air. Regeneration air exiting the sensible heat exchanger 121 flows into the hot water heat exchanger 120 through the passage 126, and its temperature is raised to 60°~80° C. by the hot water, and its relative humidity is lowered. Regeneration air exiting the hot water heat exchanger 120, having a relative low humidity, passes through the desiccant wheel 103 to remove the moisture therefrom to perform desiccant wheel regeneration. The spent air exiting from the desiccant wheel 103 preheats regeneration air flows into the sensible heat exchanger 121 through the passage 128, and is exhausted through the passage 129 to outside environment as waste gas.

As explained above, the apparatus is able to heat the process air to provide desiccant regeneration by utilizing the function of the hot water circuit, even when the process air circuit is stopped and heat recovery from the process air cannot be achieved.

Figure 13:
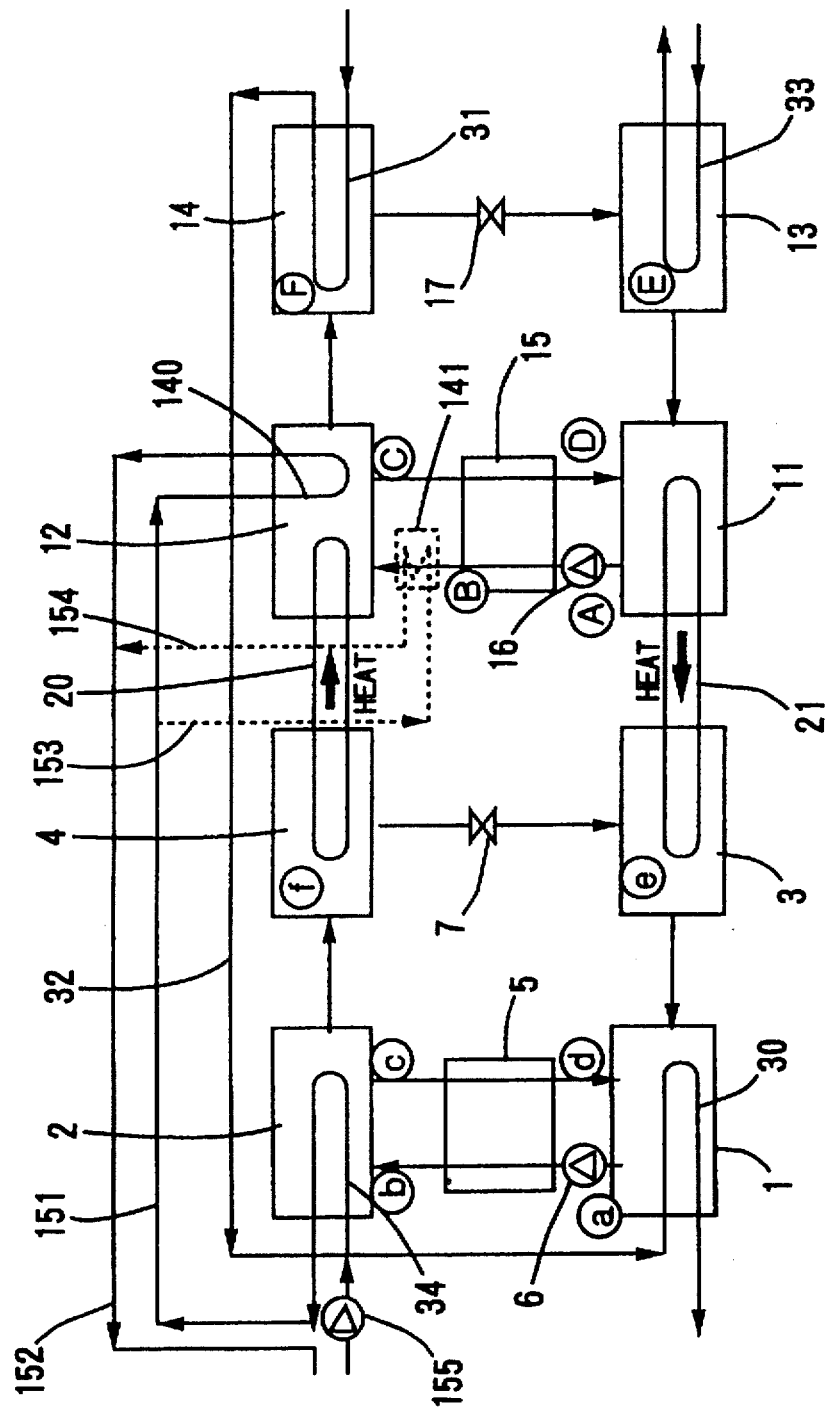
FIG. 13 is a schematic representation of a fifth embodiment of the heat pump device of the present invention.

FIG. 13 is a schematic drawing of a fifth embodiment of the heat pump according to the present invention. In this embodiment, in view of the fact that the second circulation unit operates at a lower temperature than the first circulation unit, the residual heat held by the heat transfer medium after heating the generator in the first circulation unit is utilized to heat the generator in the second circulation unit for achieving further energy conservation. Specifically, the point of difference from the heat pump shown in FIG. 1 is that an additional heat exchanger provided between the heating medium after heating the generator 2 in the first circulation unit and the solution flowing from the outlet of absorber 11 to the outlet of the generator 12 in the second circulation unit. This is achieved by a third heat exchanger (i.e. heat transfer pipe) 140 provided in the generator 12 in the second circulation unit and passages 151, 152 for connecting the heat transfer pipe 140 to the heat transfer pipe 34 for withdrawing the heating medium from the generator 2. The heating medium which as provided heat to the generator 2 is led to the heat transfer pipe 140 to exchange heat with the solution in the generator 12 in the second circulation unit. The heat transfer pipe 34 for supplying the heating medium is provided with a heating medium delivery pump 155.

The operational cycle of the absorption heat pump device is basically the same as that for the device shown in FIG. 1, and the explanations will be omitted. It is also possible to explain the operation of the device using FIG. 2, and the following will describe only the points of difference.

The solution in the second circulation unit is heated in the second generator 12 through the heat transfer pipe 20 by the heat of condensation (state f) generated in the condenser in the first circulation unit, while it is also heated through the heat transfer pipe 140, which is the third heat exchanger, by the heating medium which has provided heat to the generator 2 in the first circulation unit to generate refrigerant vapor. The operating temperature of the generator 2 in the first circulation unit is about 150°~175° C., therefore, the temperature of the heating medium exiting the generator 2 is over 150° C. On the other hand, the operating temperature of the generator 12 in the second circulation unit is 90~100° C. Therefore, it is possible to recover sensible heat in the range of 50°~60° C. through the heat transfer pipe 140 from the heating medium which has provided heat to the generator 2. This recoverable sensible heat is used for concentrating the solution in the second circulation unit. Therefore, compared with the device shown in FIG. 1, the present embodiment device is able to achieve a higher degree of energy conservation by using the high temperature fluid in the first circulation unit.

To provide a heat exchanger, for the heating medium which heated the generator 2 in the first circulation unit, with the solution flowing from the outlet of absorber 11 to the outlet of the generator 12 in the second circulation unit, it is also possible to configure passages 153, 154 and a third heat exchanger 141 as shown by the dotted lines in FIG. 13. The third heat exchanger 141 is provided in weak solution path between the second heat exchanger 15 and the generator 12 in the second circulation unit. This permits the heating medium which heated the generator in the first circulation unit exchange heat with the weak solution exiting the second heat exchanger 15 in the second circulation unit. By adopting this arrangement, it is possible to recover heat which could not be recovered in the generator 2 in the first circulation unit for use in concentrating the solution in the second circulation unit. Therefore, one thermal input source acts to concentrate solutions for providing the driving power for two refrigeration cycles. According to this configuration, the temperature of the weak solution to be provided with heat is lower than the solution temperature in the generator, it is possible to recover a larger amount of sensible heat than in the foregoing embodiments. In this case, it is permissible to eliminate the heat transfer pipe 140 provided in the generator 12 in the second circulation unit.

Figure 14:
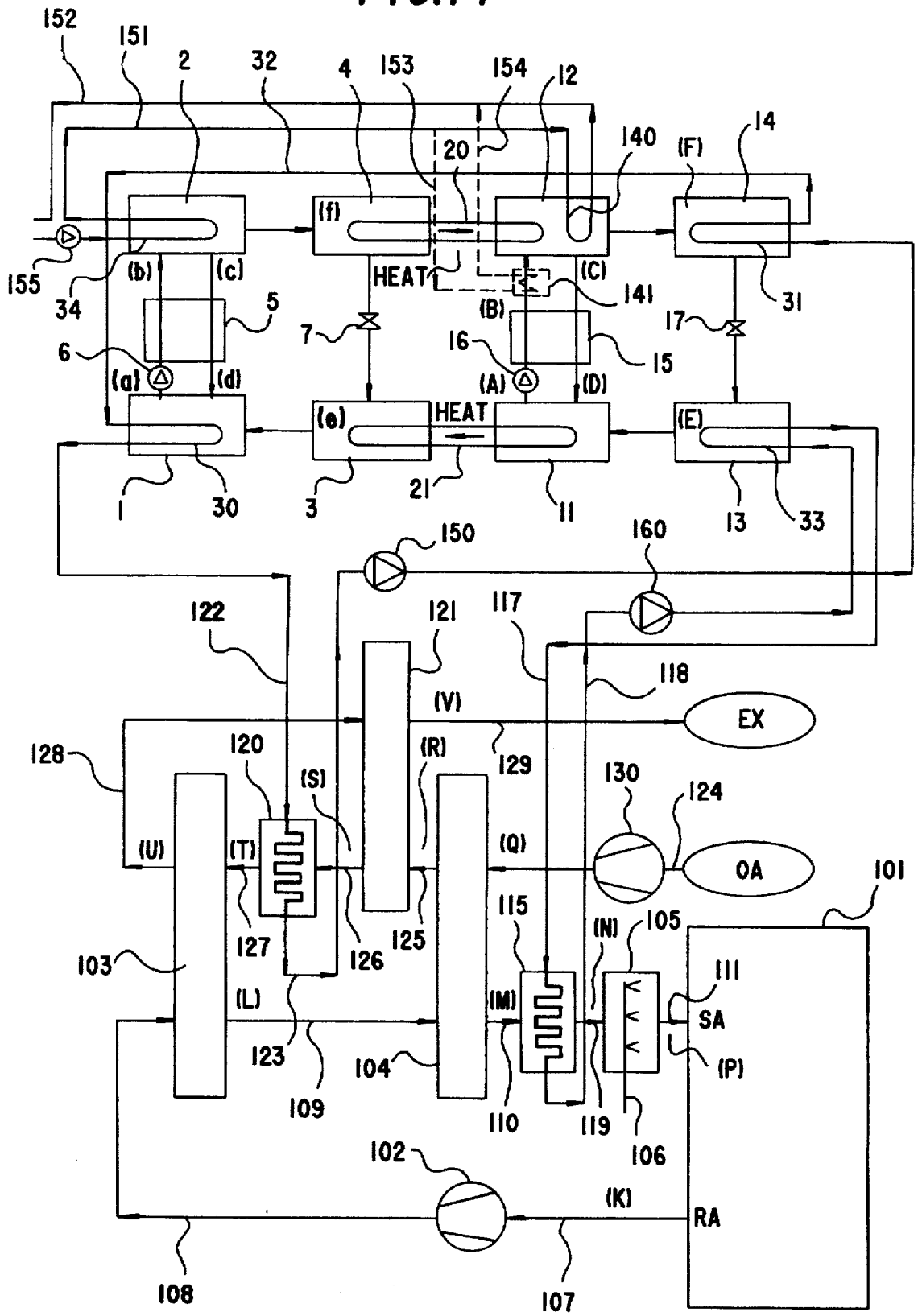
FIG. 14 is a schematic representation of an application of the heat pump shown in FIG. 13 for desiccant assisted air conditioning.
Figure 15:
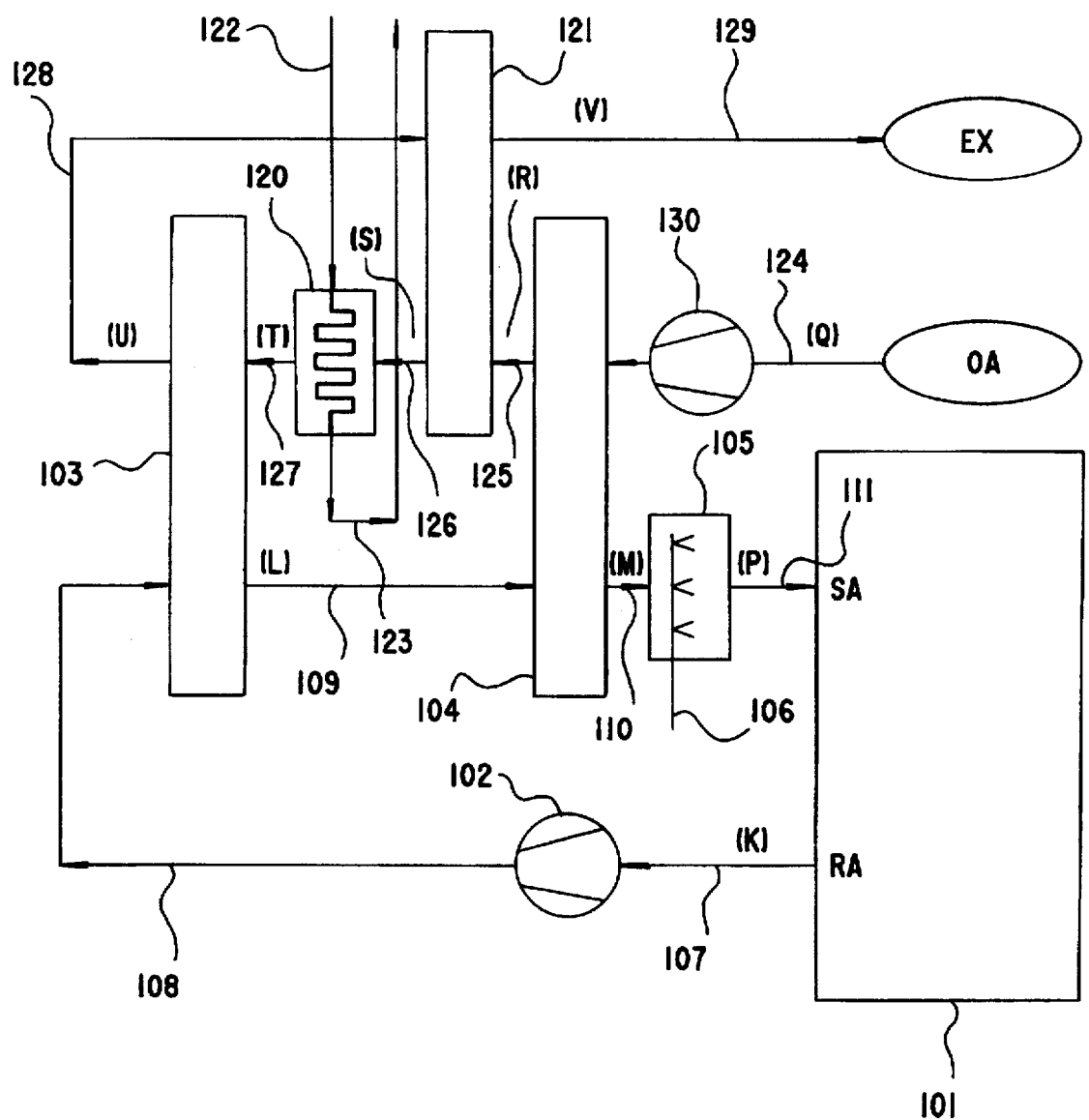
FIG. 15 is a schematic representation of a conventional desiccant assisted air conditioner.
Figure 16:
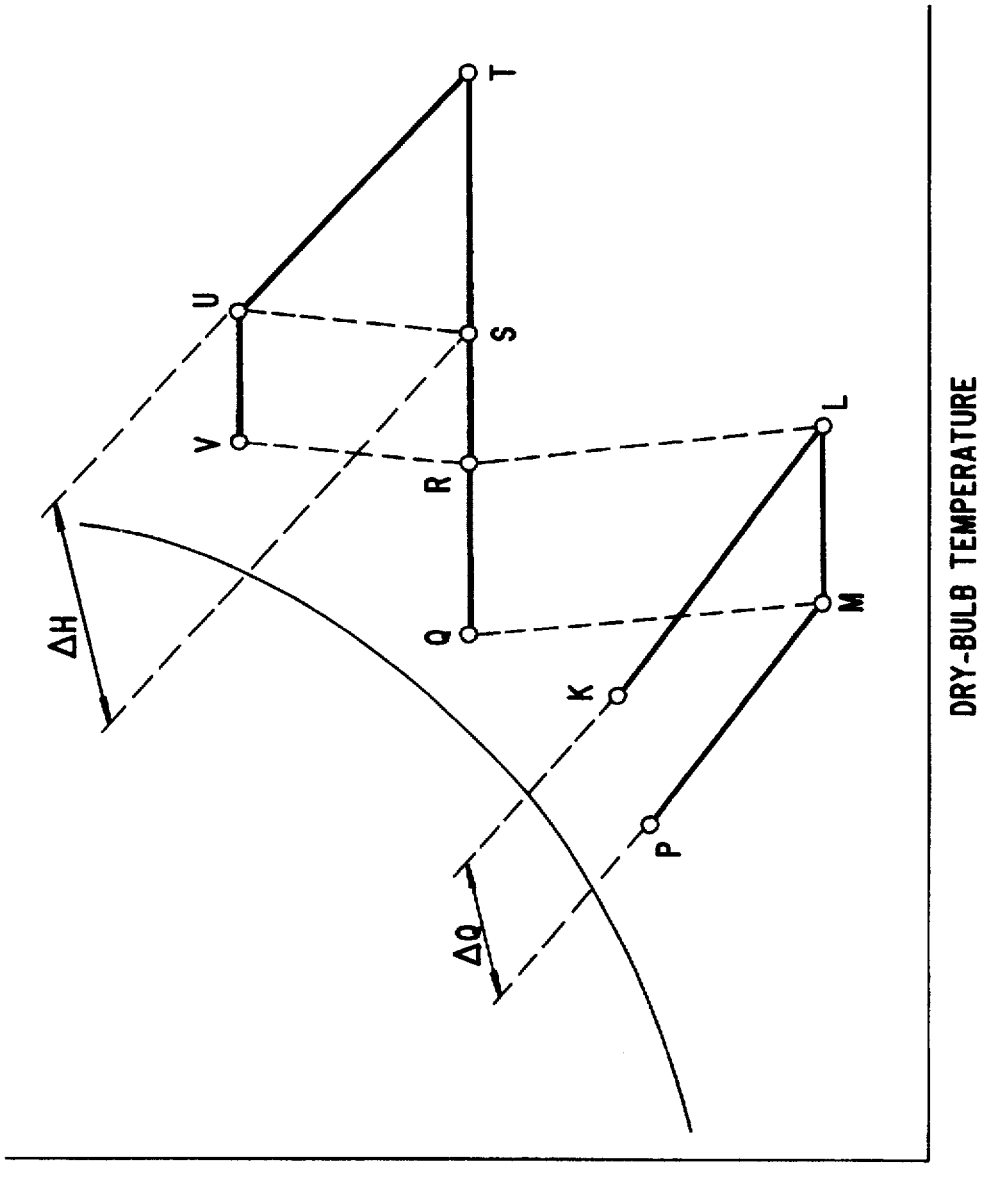
FIG. 16 is a psychrometric chart for the conventional desiccant assisted air conditioner.

FIG. 14 shows an apparatus combining the heat pump device with the desiccant assisted air conditioner, and the operational effects are the same as those in FIG. 13.

The COP for the desiccant assisted air conditioning of this embodiment can be calculated in the same manner as the previous embodiments and presents an equivalent or a higher value.

What is claimed is:

1. An absorption heat pump comprising:
   a first circulation unit having a first evaporator, a first absorber, a first generator and a first condenser for providing a first absorption refrigeration cycle operated at a first operating temperature;
   a second circulation unit having a second evaporator, a second absorber, a second generator and a second condenser for providing a second absorption refrigerating cycle operated at a second operating temperature lower than said first operating temperature;
   a first heat exchanger for performing a heat exchange between said first evaporator and said first absorber;
   a second heat exchanger for performing a heat exchange between said first condenser and said second generator; and
   a thermal medium transporting means for extracting heat of absorption in said first absorber and heat of condensation in said second condenser for external use in a manner that an absorption temperature in said first absorber is higher than condensation temperature in said second condenser; and, wherein
   a third heat exchanger for performing heat exchange between a heating medium after heating the generator in the first circulation unit and said solution staying between an outlet of said absorber and an outlet of said generator in said second circulation unit.

2. An absorption heat pump as claimed in claim 1, wherein said thermal medium transport means comprises a fluid passage means for performing heat exchange therethrough, said fluid passage means communicating with a condenser heat transfer pipe provided within said second condenser and an absorber heat transfer pipe provided within said first absorber.

3. An absorption heat pump as claimed in claim 1, wherein a combination of working fluids used in said absorption heat pump comprises a first working fluid in said first circulation unit and a second working fluid used in said second circulation unit constitutionally different from each other.

4. An absorption heat pump as claimed in claim 3, wherein said combination of working fluids includes a working fluid used in the first circulation unit which is more difficult to crystallize than the working fluid used in the second circulation unit.

5. An absorption heat pump as claimed in claim 3, wherein said first working fluid comprises a mixture of lithium bromide and zinc chloride as absorbent and water as refrigerant, while said second working fluid comprise lithium bromide as absorbent and water as refrigerant.

6. An absorption heat pump as claimed in claim 1, wherein said absorption heat pump includes: a first direct passage for directly flowing said first refrigerant condensed in said first condenser into at least one of said first absorber and said first generator of said first circulation unit; and a second direct passage for directly flowing said second refrigerant condensed in said second condenser into at least one of said second absorber and said second generator of said second circulation unit.

7. An absorption heat pump as claimed in claim 1 wherein said medium transport means includes first and second direct passages provided with valves, said valves being operated to open when a refrigeration effect provided by said heat pump is stopped.

8. An absorption heat pump comprising:
   a first circulation unit having a first evaporator, a first absorber, a first generator and a first condenser for providing a first absorption refrigeration cycle operating at a first operating temperature;
   a second circulation unit having a second evaporator, a second absorber, a second generator and a second condenser for providing a second absorption refrigeration cycle operating at a second operating temperature lower than said first operating temperature;
   a first heat exchanger for performing a heat exchange between said first evaporator and said second absorber;
   a second heat exchanger for performing a heat exchange between said first condenser and said second generator; and
   a thermal medium transport means for extracting heat of absorption in said first absorber and heat of condensation in said second condenser for external use,
   wherein a combination of working fluids used in said absorption heat pump comprises a first working fluid in said first circulation unit and a second working fluid used in said second circulation unit constitutionally different from each other.

9. An absorption heat pump as claimed in claim 8, wherein said combination of working fluids includes a working fluid in the first circulation unit which would not induce crystallization at temperature and vapor pressure conditions which would induce crystallization in the working fluid used in the second circulation unit.

10. An absorption heat pump comprising:
    a first circulation unit having a first evaporator, a first absorber, a first generator and a first condenser for providing a first absorption refrigeration cycle operated at a first operating temperature;
    a second circulation unit having a second evaporator, a second absorber, a second generator and a second condenser for providing a second absorption refrigerating cycle operated at a second operating temperature lower than said first operating temperature;

a first heat exchanger for performing a heat exchange between said first evaporator and said first absorber;

a second heat exchanger for performing a heat exchange between said first condenser and said second generator; and a thermal medium transporting means for extracting heat of absorption in said first absorber and heat of condensation in said second condenser for external use in a manner that an absorption temperature in said first absorber is higher than condensation temperature in said second condenser, by flowing thermal medium in the order from said second condenser to said first condenser.

11. An absorption heat pump comprising:

a first circulation unit having a first evaporator, a first absorber, a first generator and a first condenser for providing a first absorption refrigeration cycle operating at a first operating temperature;

a second circulation unit having a second evaporator, a second absorber, a second generator and a second condenser for providing a second absorption refrigeration cycle operating at a second operating temperature lower than said first operating temperature;

a first heat exchanger for performing a heat exchange between said first evaporator and said second absorber;

a second heat exchanger for performing heat exchange between said first condenser and said second generator; and a thermal medium transport means for extracting heat of absorption in said first absorber and heat of condensation in said second condenser by flowing thermal medium in the order from said second condenser to said first absorber;

wherein a combination of working fluids used in said absorption heat pump comprises a first working fluid in said first circulation unit and a second working fluid used in said second circulation unit constitutionally different from each other.

12. An absorption heat pump comprising:

a first circulation unit having a first evaporator, a first absorber, a first generator and a first condenser for providing a first absorption refrigeration cycle operated at a first operating temperature;

a second circulation unit having a second evaporator, a second absorber, a second generator and a second condenser for providing a second absorption refrigerating cycle operated at a second operating temperature lower than said first operating temperature;

a first heat exchanger for performing a heat exchange between said first evaporator and said first absorber;

a second heat exchanger for performing a heat exchange between said first condenser and said second generator; and a thermal medium transporting means for extracting heat of absorption in said first absorber and heat of condensation in said second condenser for external use in a manner that an absorption temperature in said first absorber is higher than condensation temperature in said second condenser, wherein said absorption heat pump is operable, without using an evaporative cooling device, to discard heat to ambient air.

13. An absorption heat pump comprising:

a first circulation unit having a first evaporator, a first absorber, a first generator and a first condenser for providing a first absorption refrigeration cycle operating at a first operating temperature;

a second circulation unit having a second evaporator, a second absorber, a second generator and a second condenser for providing a second absorption refrigeration cycle operating at a second operating temperature lower than said first operating temperature;

a first heat exchanger for performing a heat exchange between said first evaporator and said second absorber;

a second heat exchanger for performing heat exchange between said first condenser and said second generator; and a thermal medium transport means for extracting heat of absorption in said first absorber and heat of condensation in said second condenser;

wherein said absorption heat pump is operable, without using an evaporative cooling device, to discard heat to ambient air, and, wherein a combination of working fluids used in said absorption heat pump comprises a first working fluid in said first circulation unit and a second working fluid used in said second circulation unit constitutionally different from each other.

14. An absorption heat pump comprising:

a first circulation unit having a first evaporator, a first absorber, a first generator and a first condenser for providing a first absorption refrigeration cycle operated at a first operating temperature;

a second circulation unit having a second evaporator, a second absorber, a second generator and a second condenser for providing a second absorption refrigerating cycle operated at a second operating temperature lower than said first operating temperature;

a first heat exchanger for performing a heat exchange between said first evaporator and said first absorber;

a second heat exchanger for performing a heat exchange between said first condenser and said second generator; and a thermal medium transporting means for extracting heat of absorption in said first absorber and heat of condensation in said second condenser for external use in a manner that an absorption temperature in said first absorber is higher than condensation temperature in said second condenser, wherein said absorption heat pump is operable with a temperature difference of more that 7° C. between condensation temperature at said condenser in said second circulation unit and absorption temperature at said absorber in said first circulation unit.

15. An absorption heat pump comprising:

a first circulation unit having a first evaporator, a first absorber, a first generator and a first condenser for providing a first absorption refrigeration cycle operating at a first operating temperature;

a second circulation unit having a second evaporator, a second absorber, a second generator and a second condenser for providing a second absorption refrigeration cycle operating at a second operating temperature lower than said first operating temperature;

a first heat exchanger for performing a heat exchange between said first evaporator and said second absorber;

a second heat exchanger for performing heat exchange between said first condenser and said second generator; and a thermal medium transport means for extracting heat of absorption in said first absorber and heat of condensation in said second condenser;

wherein said absorption heat pump is operable with a temperature difference of more that 7° C. between condensation temperature at said condenser in said second circulation unit and absorption temperature at said absorber in said first circulation unit; and wherein a combination of working fluids used in said absorption heat pump comprises a first working fluid in said first circulation unit and a second working fluid used in said second circulation unit constitutionally different from each other.

* * * * *